(12) United States Patent
Caiozza

(10) Patent No.: US 7,569,963 B2
(45) Date of Patent: Aug. 4, 2009

(54) WIND DRIVEN ELECTRIC GENERATOR APPARATUS

(75) Inventor: Joseph C. Caiozza, 321 W. Market St., Long Beach, NY (US) 11561

(73) Assignee: Joseph C. Caiozza, Long Beach, NY (US)

( * ) Notice: Subject to any disclaimer, the term of this patent is extended or adjusted under 35 U.S.C. 154(b) by 105 days.

(21) Appl. No.: 11/809,945

(22) Filed: Jun. 4, 2007

(65) Prior Publication Data

US 2007/0241623 A1   Oct. 18, 2007

Related U.S. Application Data

(62) Division of application No. 11/199,406, filed on Aug. 8, 2005, now Pat. No. 7,227,276.

(51) Int. Cl.
    *H02K 17/42* (2006.01)
(52) U.S. Cl. .................. 310/171; 31/83; 31/99
(58) Field of Classification Search ............. 310/83, 310/89, 99, 112–115, 168, 171
    See application file for complete search history.

(56) References Cited

U.S. PATENT DOCUMENTS

| | | | | |
|---|---|---|---|---|
| 5,004,944 A | * | 4/1991 | Fisher | 310/266 |
| 5,311,092 A | * | 5/1994 | Fisher | 310/266 |
| 5,319,844 A | * | 6/1994 | Huang et al. | 29/598 |
| 5,793,136 A | * | 8/1998 | Redzic | 310/114 |
| 6,794,781 B2 | * | 9/2004 | Razzell et al. | 310/114 |
| 7,042,109 B2 | * | 5/2006 | Gabrys | 290/44 |

* cited by examiner

Primary Examiner—Thanh Lam
(74) Attorney, Agent, or Firm—Michael Bender

(57) ABSTRACT

A wind driven electric generator apparatus includes a pair of wind-driven, counter-rotating propeller units placed back to back with each other. A first power transmission system is connected to the pair of counter-rotating propeller units for converting wind energy into mechanical energy. A second power transmission system is connected to the first power transmission system. A generator is connected to the second power transmission system for converting mechanical energy into electrical energy. Propeller unit orientation means are supported by a first transmission housing for orienting the pair of counter-rotating propeller units with respect to wind that is sensed. Self-adjusting propeller blade angle adjustment means are supported by the pair of counter-rotating propeller units for adjusting propeller blade angles in response to wind that is sensed.

20 Claims, 15 Drawing Sheets

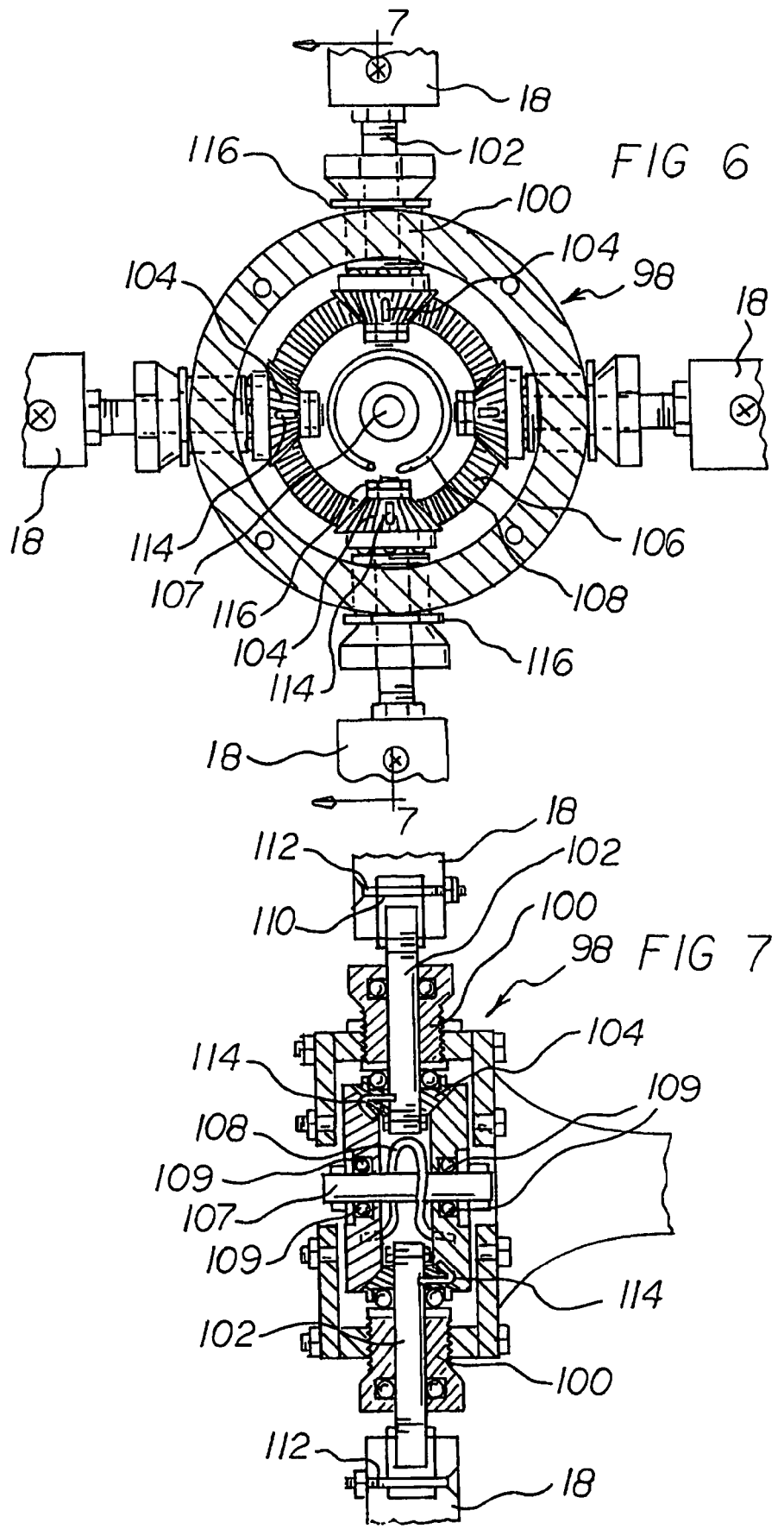

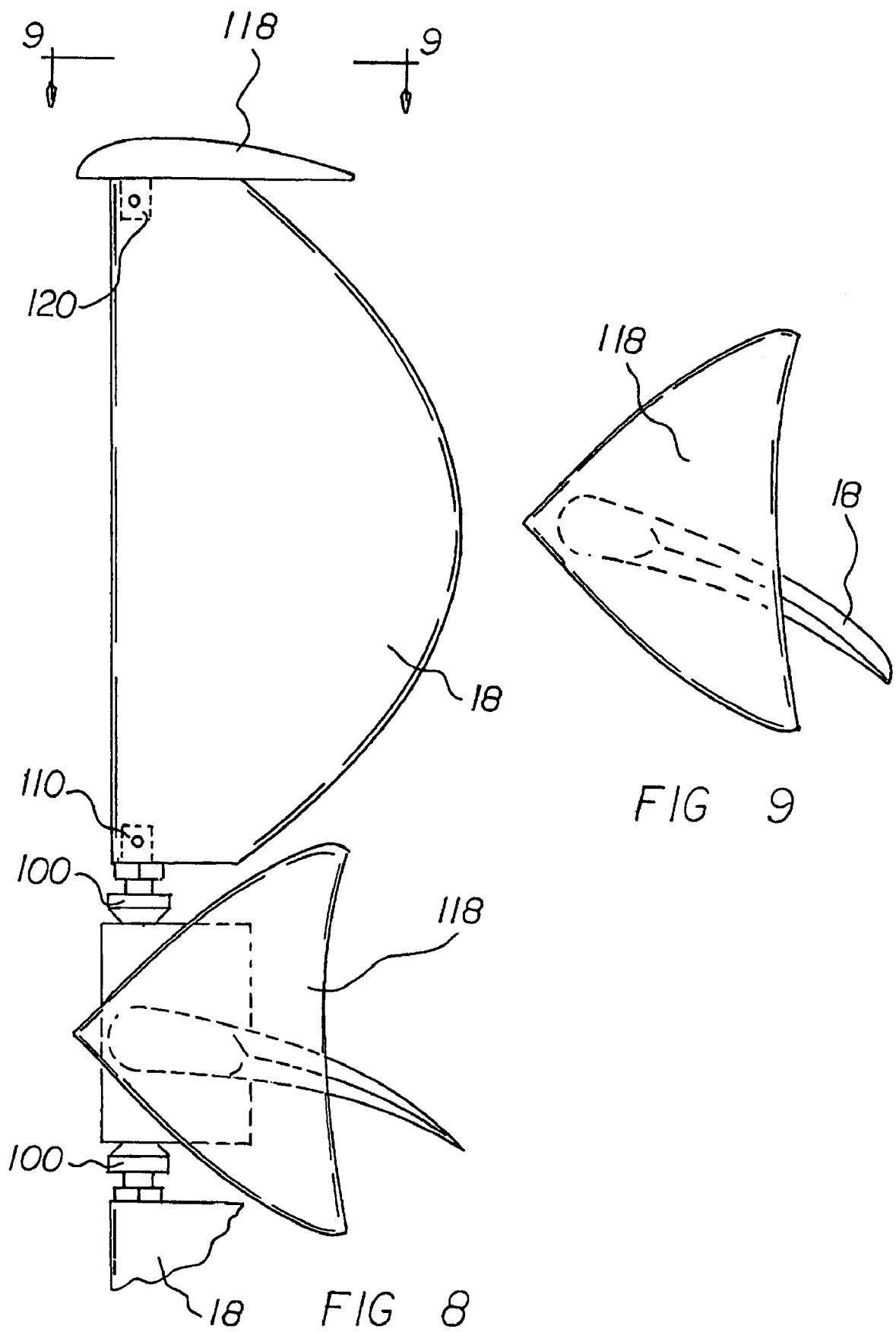

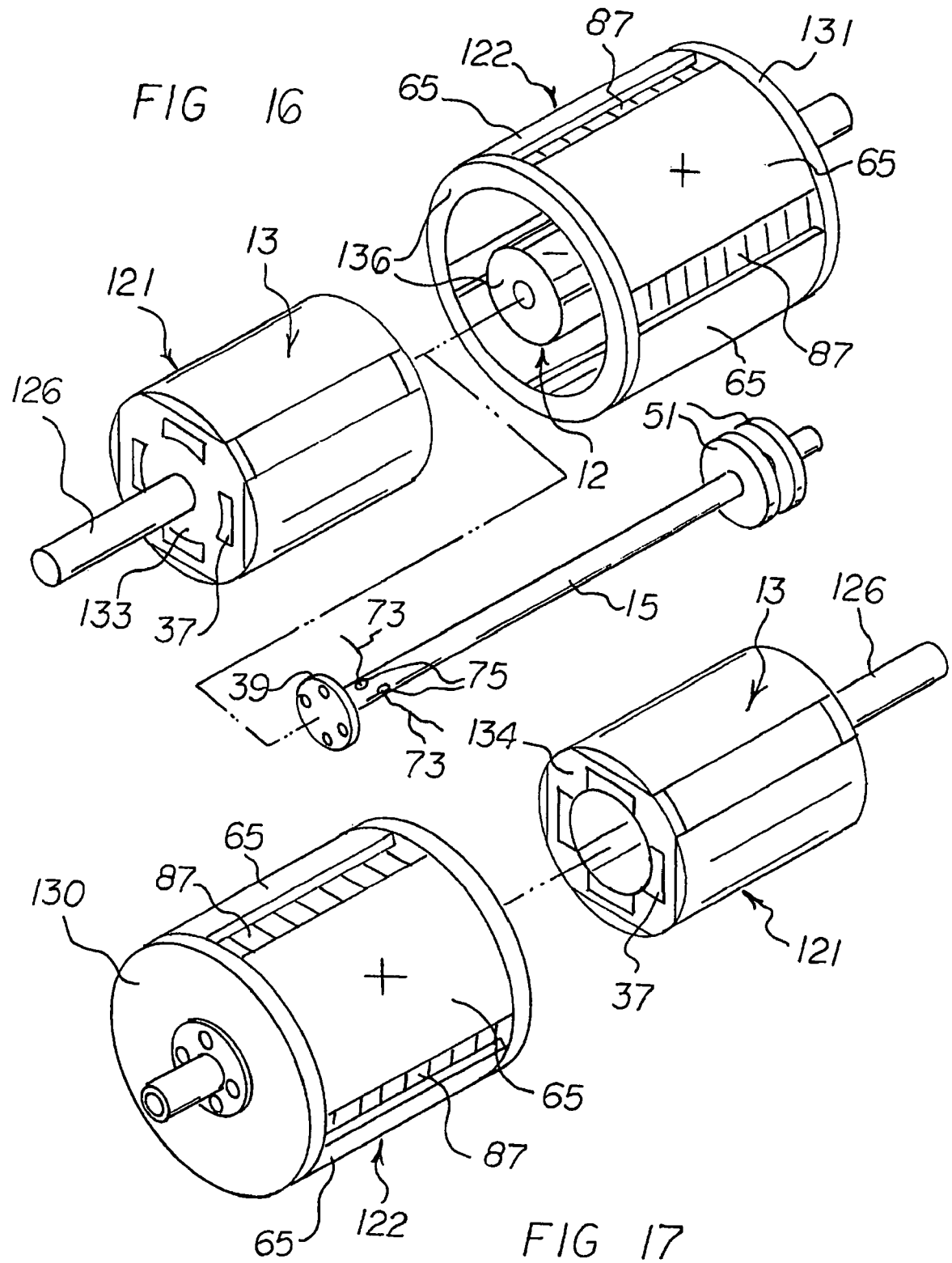

FIG 23
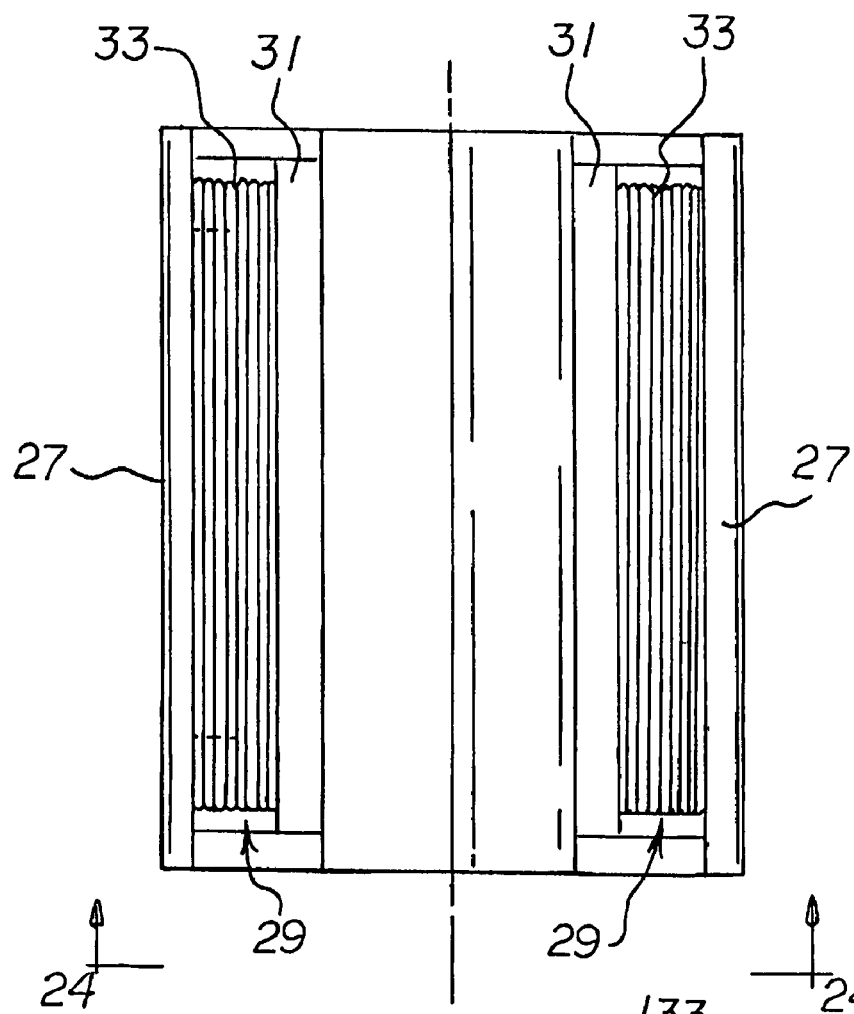
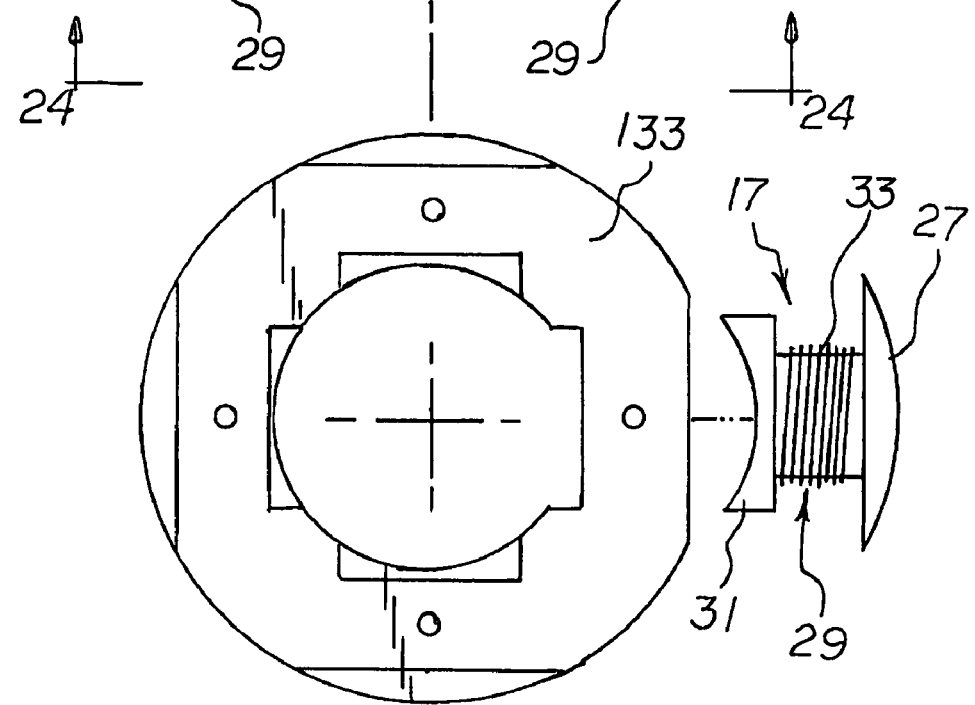
FIG 24

WIND DRIVEN ELECTRIC GENERATOR APPARATUS

RELATED APPLICATION

The present application is a Divisional application of prior application Ser. No. 11/199,406; filed Aug. 8, 2005 (now U.S. Pat. No. 7,227,276), which prior application hereby is incorporated herein by this reference.

BACKGROUND OF THE INVENTION

1. Field of the Invention

The present invention relates generally to wind driven electric generators or alternators, and, more particularly, to a wind driven electric generator apparatus especially adapted for adjusting the orientation of wind driven propeller blades to the wind.

2. Description of the Prior Art

A wind driven electric generator apparatus generally has a number of component subassemblies which include wind-energy-reception means, wind-energy-to-mechanical-energy conversion means, and mechanical-energy-to-electrical-energy conversion means. To go beyond this basic wind driven electric generator apparatus, certain improvements would be desirable.

For example, it would be desirable for a wind driven electric generator apparatus to also include propeller unit orientation means. This is desirable so that the speed of the propeller blades can be controlled so that they do not turn too quickly or too slowly.

It would also be desirable if self-adjusting propeller blade angle adjustment means would be provided. This is desirable so that the optimum effects of the wind can be taken advantage of.

Still other features would be desirable in a wind driven electric generator apparatus. For example, it would be desirable if a wind driven electric generator apparatus would be provided that includes a pair of counter-rotating propeller units. This is advantageous to extract optimum energy from the wind.

Conventionally, an electric generator or alternator is constructed from a relatively small number of relatively large magnetic components. In contrast, the present inventor discloses electric generators and the like which include relatively large numbers of relatively small magnets. The present inventor has discovered that increased economies and efficiencies are obtained thereby.

Conventionally, an electric generator or alternator employs a single rotating armature and a non-rotating or fixed stator. With a single rotating armature and a non-rotating or fixed stator, the breaking of the magnetic lines of flux depends upon the speed of rotation of the single armature. To double the rate of breaking the magnetic lines of flux, it would be required to double the rate of rotation of the armature. Doubling of the rate of rotation of the armature may not be practical for a number of reasons, including wear and tear on bearings. Moreover, in the case of an electric generator that is powered by the wind, it may not be possible to have the wind increase to a sufficient rate to drive a single armature at a doubled rate. In view of the above, it would be desirable to provide an electric generator that can double the rate of the breaking of the magnetic lines of flux without increasing the rate of rotation of a single rotating armature.

Although it is well known to use wind-powered machines to generate electricity, the present invention provides a wind driven electric generator apparatus which has the following combination of desirable features: (1) includes propeller unit orientation means; (2) provides self-adjusting propeller blade angle adjustment means; (3) provides a pair of counter-rotating propeller units; (4) discloses electric generators and the like which include relatively large numbers of relatively small magnets; and (5) provides an electric generator that can double the rate of the breaking of the magnetic lines of flux without increasing the rate of rotation of a single rotating armature. The foregoing desired characteristics are provided by the unique wind driven electric generator apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a wind driven electric generator apparatus which includes wind-energy-reception means for receiving wind energy, wherein the wind-energy-reception means include a pair of counter-rotating propeller units placed back to back with each other. Wind-energy-to-mechanical-energy conversion means are connected to the wind-energy-reception means for converting wind energy into mechanical energy. The wind-energy-to-mechanical-energy conversion means include a first power transmission system connected to the pair of counter-rotating propeller units. A second power transmission system is connected to the first power transmission system, and a first transmission housing is provided for housing the first power transmission system. Mechanical-energy-to-electrical-energy conversion means are connected to the wind-energy-to-mechanical-energy conversion means for converting mechanical energy into electrical energy. The mechanical-energy-to-electrical-energy conversion means are connected to the second power transmission system. Propeller unit orientation means are supported by the first transmission housing for orienting the pair of counter-rotating propeller units with respect to wind that is sensed. Self-adjusting propeller blade angle adjustment means are supported by the pair of counter-rotating propeller units for adjusting propeller blade angles in response to wind that is sensed.

The pair of counter-rotating propeller units include first propeller blades, first intermediate gearing connected to the first propeller blades, and a first propeller shaft connected to the first intermediate gearing. In addition, the pair of counter-rotating propeller units also include second propeller blades, second intermediate gearing connected to the second propeller blades, and a second propeller shaft connected to the second intermediate gearing.

The first intermediate gearing and the second intermediate gearing are substantially the same.

More specifically, the first power transmission system includes a first propeller-driven ring gear connected to the first propeller shaft, a second propeller-driven ring gear connected to the second propeller shaft, a first power shaft gear assembly connected to the first propeller-driven ring gear and the second propeller-driven ring gear, and a main power shaft which includes a first power shaft end and a second power shaft end. The first power shaft end is connected to the first power shaft gear assembly. A shaft hub bearing is provided for receiving ends of the first propeller shaft, the second propeller shaft, and the main power shaft. A second power shaft gear assembly is connected to the second power shaft end, wherein the second power shaft gear assembly is connected to the second power transmission system.

The first power shaft gear assembly includes a first power shaft ring gear spaced apart from a second power shaft ring gear, and the first propeller-driven ring gear and the second propeller-driven ring gear are connected between the first power shaft ring gear and the second power shaft ring gear.

The second power shaft gear assembly includes a third power shaft ring gear spaced apart from a fourth power shaft ring gear, and the second power transmission system includes a first transmission-driving ring gear connected between the third power shaft ring gear and the fourth power shaft ring gear. A first transmission-driving shaft is connected to the first transmission-driving ring gear, and a multi-speed transmission is connected to the first transmission-driving shaft.

The first transmission housing includes a stationary first transmission housing portion, and a rotatable second transmission housing portion is supported by the stationary first transmission housing portion.

The stationary first transmission housing portion includes a stationary base portion, and a stationary support column is supported by the stationary base portion.

The propeller unit orientation means are housed within the rotatable second transmission housing portion and are supported by the stationary first transmission housing portion. The propeller unit orientation means include a stationary track-containing base member supported by the stationary first transmission housing portion. The stationary track-containing base member includes a peripheral circular track portion. Track-supporting radial spoke portions are connected to the peripheral circular track portion, and an inner base ring is connected to the track-supporting radial spoke portions. A through-channel is defined by the inner base ring, and the main power shaft extends through the through-channel.

A rotatable ring member supports the rotatable second transmission housing portion. The rotatable ring member has a fixed connection with the rotatable second transmission housing portion, and the rotatable ring member includes an internal ring gear and a plurality of lock-pin-reception channels arrayed in a circular array in the rotatable ring member. A set of track-reception rollers are supported by the rotatable second transmission housing portion. The track-reception rollers receive and support the peripheral circular track portion. The rotatable second transmission housing portion is supported by the peripheral circular track portion.

An electrically-operated lock unit is supported by the stationary track-containing base member. The electrically-operated lock unit includes a solenoid portion and a lock pin portion controlled by the solenoid portion. The lock pin portion is received in a selected lock-pin-reception channel. An electrically-operated rotation drive unit is supported by the stationary track-containing base member. The electrically-operated rotation drive unit includes a rotational drive motor supported by the stationary track-containing base member. A rotational drive shaft is connected to the rotational drive motor, and a rotational drive gear is connected to the rotational drive shaft. The rotational drive gear engages the internal ring gear for rotating the first rotating propeller unit, the second rotating propeller unit, and the rotatable second transmission housing portion around the stationary first transmission housing portion.

Preferably, a reception-channel sensor assembly, supported by the stationary track-containing base member, is provided for sensing the lock-pin-reception channels in the rotatable ring member. The reception-channel sensor assembly includes a sensor housing portion and a sensor probe portion extending outward from the sensor housing portion toward the lock-pin-reception channel.

For each respective counter-rotating propeller unit, the self-adjusting propeller blade angle adjustment means include respective intermediate gearing connected to a respective propeller shaft. An intermediate gearing housing is provided for housing the intermediate gearing. The intermediate gearing housing is supported by the rotatable second transmission housing portion, and respective propeller blades are connected to the intermediate gearing.

Preferably, the self-adjusting propeller blade angle adjustment means further include blade bearings connected to the intermediate gearing housing for receiving propeller blade shafts. A blade angle rotation gear is connected to a proximal end of each propeller blade shaft. A pair of blade angle adjustment ring gears are housed in the intermediate gearing housing for meshing with the blade angle rotation gears therebetween the pair of blade angle adjustment ring gears. The blade angle adjustment ring gears are supported by a ring gear support shaft, which is supported by ball bearings.

Bias force means are connected to the blade angle rotation gears for biasing the blade angle rotation gears with respect to the blade angle adjustment ring gears, thereby controlling the blade angle rotation gears and the propeller blade angles of the propeller blades. The bias force means include a wire spring.

The self-adjusting propeller blade angle adjustment means further include propeller blade mounting blocks contained in the propeller blades. The propeller blade mounting blocks receive distal ends of the propeller blade shafts, and the mounting bolts are provided for securing the propeller blade shafts to the propeller blade mounting blocks. Jam lock pins are provided to lock respective propeller blade shafts to the blade angle rotation gears. Jam nuts are provided to apply pressure to the jam lock pins.

Turbulence reducing winglets can be attached to respective end tips of the propeller blades.

A pair of weather stations can be mounted on front ends of the pair of counter-rotating propeller units. Each of the weather stations can include a station-mounting shaft which is connected to a hub portion of a respective counter-rotating propeller unit.

The mechanical-energy-to-electrical-energy conversion means include an electric generator.

The electric generator includes a generator housing, an armature assembly support structure housed within the generator housing, and a rotation/counter-rotation drive assembly supported by the armature assembly support structure and connected to the second power transmission system. A rotatable interior armature assembly is connected to the rotation/counter-rotation drive assembly and is supported by the armature assembly support structure. A counter-rotatable armature assembly is spaced apart from and surrounds a portion of the rotatable interior armature assembly. The counter-rotatable armature assembly is supported by the armature assembly support structure and is connected to the rotation/counter-rotation drive assembly.

In accordance with another aspect of the invention, an electric generator includes a generator housing, an armature assembly support structure housed within the generator housing, a rotation/counter-rotation drive assembly supported by the armature assembly support structure and connected to the, second power transmission system, a rotatable interior armature assembly connected to the rotation/counter-rotation drive assembly and supported by the armature assembly support structure, a counter-rotatable armature assembly spaced apart from and surrounding a portion of the rotatable interior armature assembly. The counter-rotatable armature assembly is supported by the armature assembly support structure and is connected to the rotation/counter-rotation drive assembly.

The counter-rotatable armature assembly includes a counter armature rear wall and a counter armature front wall. The rotatable interior armature assembly includes a interior armature front wall and a interior armature rear wall. The counter armature front wall includes a drive-shaft-to-front-wall roller bearing. The interior armature front wall and the interior armature rear wall include coolant flow-through channels.

A rotatable armature-to-armature bearing assembly is connected between the rotatable interior armature assembly and the counter-rotatable armature assembly. Preferably, the rotatable armature-to-armature bearing assembly includes a plurality of rollers supported by the counter armature rear wall. A roller-reception flange is supported by the interior armature rear wall. The roller-reception flange receives the rollers, thereby permitting the counter-rotatable armature assembly and the rotatable interior armature assembly to rotate simultaneously in opposite directions from each other. Such simultaneous rotation provides intensive breaking of magnetic lines of force to generate intense voltages.

More specifically, the rotation/counter-rotation drive assembly includes a generator drive shaft connected to the second power transmission system. The generator drive shaft is connected to the rotatable interior armature assembly for driving the rotatable interior armature assembly in a first rotational direction. A generator sun gear is connected to the generator drive shaft. A plurality of generator planetary gears are connected to the generator sun gear. A generator ring gear encircles and is connected with the generator planetary gears, wherein the generator ring gear is in contact with a front wall of the counter-rotatable armature assembly for driving the counter-rotatable armature assembly in a second rotational direction which is counter-rotational to the first rotational direction.

Preferably, a fluid coolant system supported by the generator housing or the armature assembly support structure for cooling the counter-rotatable armature assembly and the rotatable interior armature assembly. The fluid coolant system includes coolant spray nozzles supported by the generator housing or by the armature assembly support structure. In addition, the fluid coolant system includes a radiator for cooling the coolant.

Preferably, the rotatable interior armature assembly includes a pole and coil array which is surrounded by the counter-rotatable armature assembly. An interior armature front wall and an interior armature rear wall support the pole and coil array. An inner tubular axle is supported by the interior armature front wall. The inner tubular axle includes wire-reception channels for receiving wires from the pole and coil array. The wires are connected to rotating electrical contacts which are connected to the inner tubular axle.

The counter-rotatable armature assembly includes a peripheral counter-rotatable armature assembly portion which jackets the outside of the pole and coil array. The counter-rotatable armature assembly also includes a center counter-rotatable armature assembly portion which extends into an interior portion of the pole and coil array.

More specifically, the peripheral counter-rotatable armature assembly portion includes a counter armature front wall, a counter armature rear wall, and a plurality of peripheral outer shell segments sandwiched between the counter armature front wall and the counter armature rear wall. A plurality of outer-shell-to-outer-shell magnets are interconnected between adjacent peripheral outer shell segments. A plurality of peripheral inner shell segments are adjacent to the peripheral outer shell segments, and a plurality of inner-shell-to-inner-shell magnets are interconnected between adjacent peripheral inner shell segments. A plurality of outer-shell-to-inner-shell magnets are interconnected between adjacent peripheral outer shell segments and peripheral inner shell segments.

Preferably, the center counter-rotatable armature assembly portion includes a plurality of center individual magnets. A plurality of center magnet interconnector members are connected between the center individual magnets and a plurality of shell-to-shell magnets. A plurality of center assembly shell segments are connected to the shell-to-shell magnets and a portion of the center individual magnets. The center individual magnets are arrayed in a plurality of positive-pole-to-negative-pole arrangements, and the center assembly shell segments are arrayed in a positive-pole-to-negative-pole arrangement around the array of the center individual magnets.

More specifically, the pole and coil array includes a plurality of pole and coil units. The pole and coil units are arrayed as opposing pairs of pole and coil units.

Preferably, each pole and coil unit includes a top pole portion, a wire-reception post extending downward from the top pole portion, a bottom pole portion connected to the wire-reception post, and a quantity of wire coiled around the wire-reception post to form a wire coil mounted on the wire-reception post.

A continuous quantity of wire extends from each wire coil in each pole and coil unit through the inner tubular axle to rotating electrical contacts connected to the inner tubular axle. Preferably, the rotating electrical contacts are in a form of electrical contact slipper rings.

The armature assembly support structure includes a roller bearing. The peripheral counter-rotatable armature assembly portion includes a rotatable bearing sleeve connected to the counter armature rear wall. The rotatable bearing sleeve is received in the roller bearing, and the inner tubular axle is received in the rotatable bearing sleeve.

The wire-reception post and the wire coil are substantially coextensive with the top pole portion and the bottom pole portion so that the wire coil is substantially coextensive with magnetic flux generated by the inner core magnet array.

In accordance with another aspect of the invention, a wind energy conversion apparatus includes wind-energy-reception means for receiving wind energy, wherein the wind-energy-reception means include a pair of counter-rotating propeller units placed back to back with each other. Wind-energy-to-mechanical-energy conversion means are connected to the wind-energy-reception means for converting wind energy into mechanical energy. The wind-energy-to-mechanical-energy conversion means include a first power transmission system connected to the pair of counter-rotating propeller units, a second power transmission system connected to the first power transmission system, and a first transmission housing for housing the first power transmission system. Propeller unit orientation means are supported by the first transmission housing, for orienting the pair of counter-rotating propeller units with respect to wind that is sensed. Self-adjusting propeller blade angle adjustment means are supported by the pair of counter-rotating propeller units for adjusting propeller blade angles in response to wind that is sensed.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be reflected in the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wind driven electric generator apparatus which has all of the advantages of the prior art and none of the disadvantages.

Still yet a further object of the present invention is to provide a new and improved wind driven electric generator apparatus which includes propeller unit orientation means.

Still another object of the present invention is to provide a new and improved wind driven electric generator apparatus that provides self-adjusting propeller blade angle adjustment means.

Yet another object of the present invention is to provide a new and improved wind driven electric generator apparatus which provides a pair of counter-rotating propeller units.

Even another object of the present invention is to provide a new and improved wind driven electric generator apparatus that discloses electric generators and the like which include relatively large numbers of relatively small magnets.

Still a further object of the present invention is to provide a new and improved wind driven electric generator apparatus which provides an electric generator that can double the rate of the breaking of the magnetic lines of flux without increasing the rate of rotation of a single rotating armature.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 6 is a cross-sectional view of the portion of the embodiment of the wind driven electric generator apparatus of FIG. 2 taken along line 6-6 thereof.

FIG. 7 is a cross-sectional view of the portion of the embodiment of the wind driven electric generator apparatus of FIG. 6 taken along line 7-7 thereof.

FIG. 8 is a partial side view of another embodiment of the invention wherein winglets are installed on the tips of propeller blades.

FIG. 9 is a top view of the portion of the embodiment of the invention shown in FIG. 8, taken along line 9-9 thereof.

FIG. 16 is an exploded perspective front view of the invention showing the relationship between the rotatable interior armature assembly, the counter-rotatable armature assembly, and the inner axle.

FIG. 17 is an exploded perspective rear view of the invention showing the relationship between the peripheral counter-rotatable armature assembly portion of the counter-rotatable armature assembly and the rotatable interior armature assembly.

FIG. 23 is a top view of the rotatable interior armature assembly shown in FIG. 21, taken along line 23-23 thereof.

FIG. 24 is a partially exploded front view of the rotatable interior armature assembly of FIG. 23, taken along line 24-24 thereof.

DESCRIPTION OF THE PREFERRED EMBODIMENT

Figure 1:
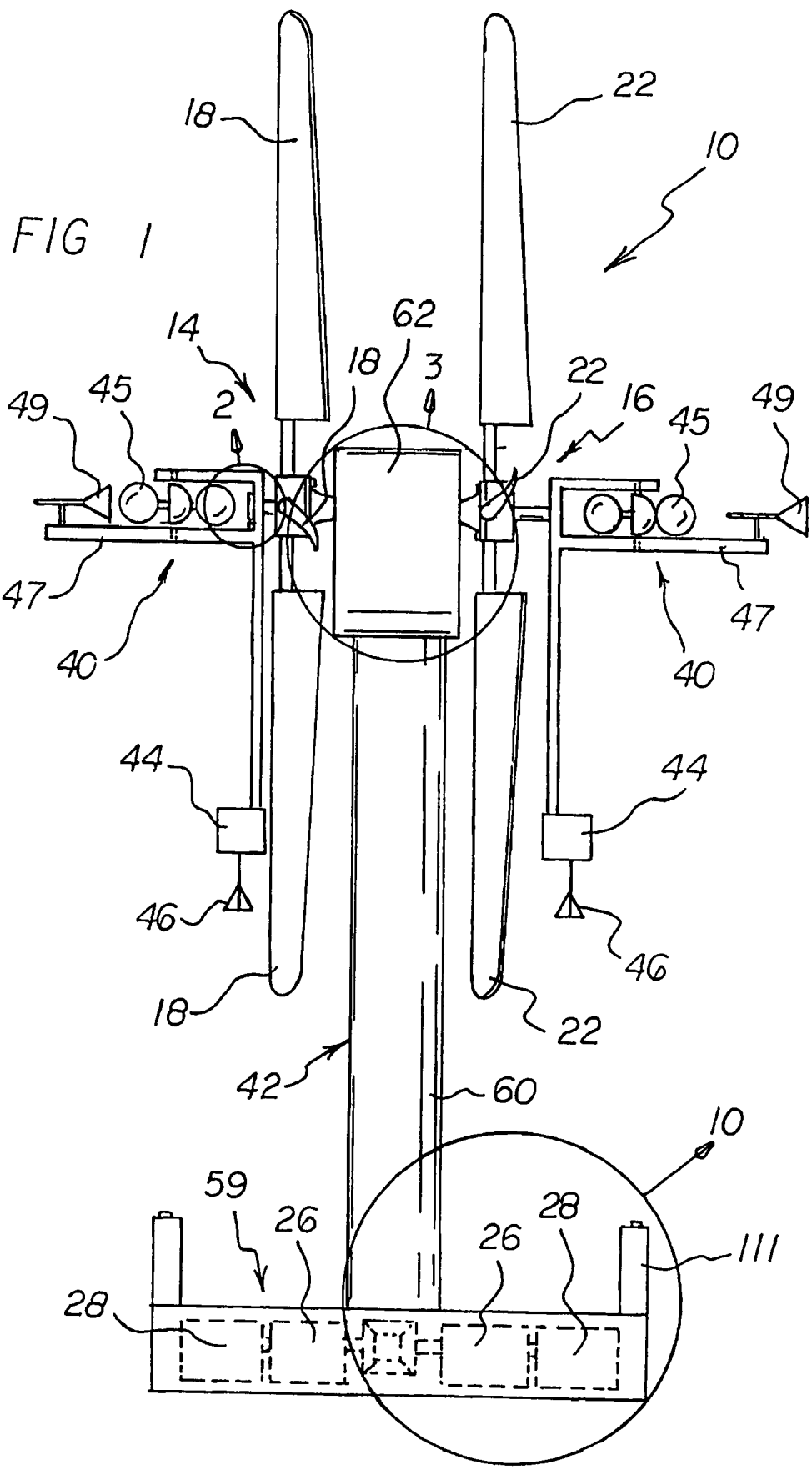
FIG. 1 is a side view showing a preferred embodiment of the wind driven electric generator apparatus of the invention.

With reference to the drawings, a new and improved wind driven electric generator apparatus embodying the principles and concepts of the present invention will be described.

Turning to FIGS. 1-24, there is shown a preferred embodiment of the wind driven electric generator apparatus of the invention generally designated by reference numeral 10. In the preferred embodiment, wind driven electric generator apparatus 10 includes wind-energy-reception means for receiving wind energy, wherein the wind-energy-reception means include a pair of counter-rotating propeller units placed back to back with each other. Wind-energy-to-mechanical-energy conversion means are connected to the wind-energy-reception means for converting wind energy into mechanical energy. The wind-energy-to-mechanical-energy conversion means include a first power transmission system connected to the pair of counter-rotating propeller units. A second power transmission system is connected to the first power transmission system, and a first transmission housing 42 is provided for housing the first power transmission system. Mechanical-energy-to-electrical-energy conversion means are connected to the wind-energy-to-mechanical-energy conversion means for converting mechanical energy into electrical energy. The mechanical-energy-to-electrical-energy conversion means are connected to the second power transmission system. Propeller unit orientation means are supported by the first transmission housing 42 for orienting the pair of counter-rotating propeller units with respect to wind that is sensed. Self-adjusting propeller blade angle adjustment means are supported by the pair of counter-rotating propeller units for adjusting propeller blade angles in response to wind that is sensed.

The direction and the intensity of wind often change frequently. In this respect, the propeller unit orientation means and the self-adjusting propeller blade angle adjustment means are provided for making sure that the apparatus takes optimum and real-time advantage of the real-time wind vector, whenever the direction and intensity of the wind changes.

The pair of counter-rotating propeller units include first propeller blades 18, first intermediate gearing connected to the first propeller blades 18, and a first propeller shaft 19 connected to the first intermediate gearing. In addition, the pair of counter-rotating propeller units also include second propeller blades 22, second intermediate gearing connected to the second propeller blades 22, and a second propeller shaft 23 connected to the second intermediate gearing.

Preferably, each of the counter-rotating propeller units includes four propeller blades. The first intermediate gearing and the second intermediate gearing are substantially the same.

As shown in FIGS. 2-5 more specifically, the first power transmission system includes a first propeller-driven ring gear 20 connected to the first propeller shaft 19, a second propeller-driven ring gear 24 connected to the second propeller shaft 23, a first power shaft gear assembly connected to the first propeller-driven ring gear and the second propeller-driven ring gear, and a main power shaft 30 which includes a first power shaft end 32 and a second power shaft end 34. The first power shaft end 32 is connected to the first power shaft gear assembly. A shaft hub bearing 25 is provided for receiving ends of the first propeller shaft 19, the second propeller shaft 23, and the main power shaft 30. A second power shaft gear assembly is connected to the second power shaft end 34, wherein the second power shaft gear assembly is connected to the second power transmission system.

Figure 2:
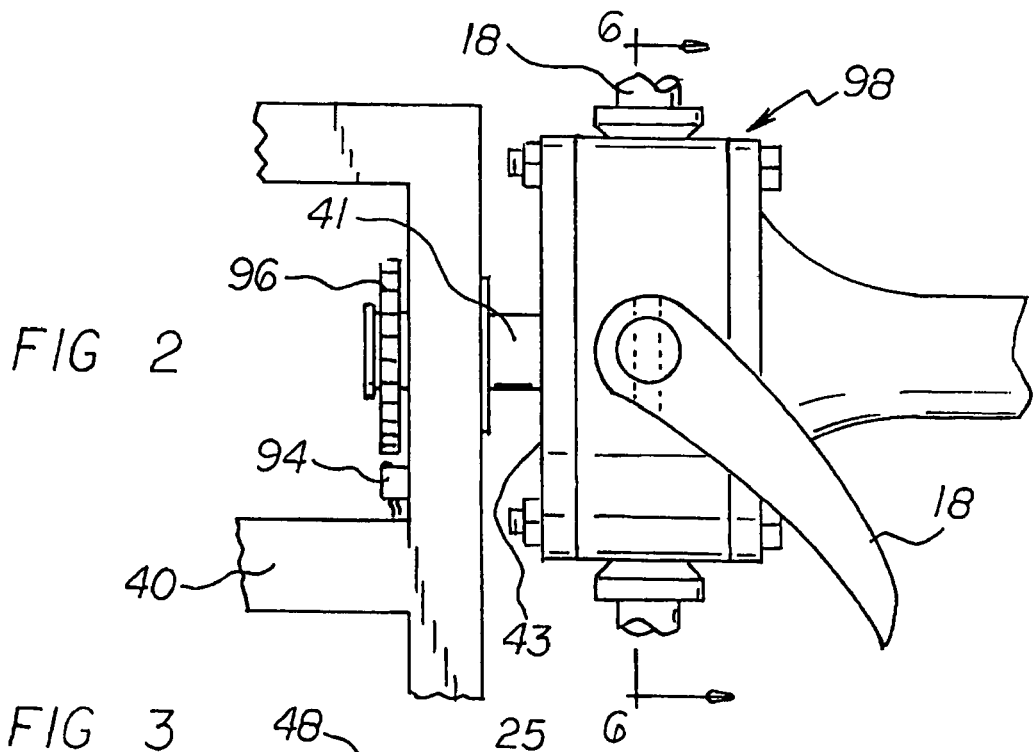
FIG. 2 is an enlarged view of the portion of the embodiment of the invention shown in FIG. 1 that is contained in circled area 2 of FIG. 1.
Figure 3:
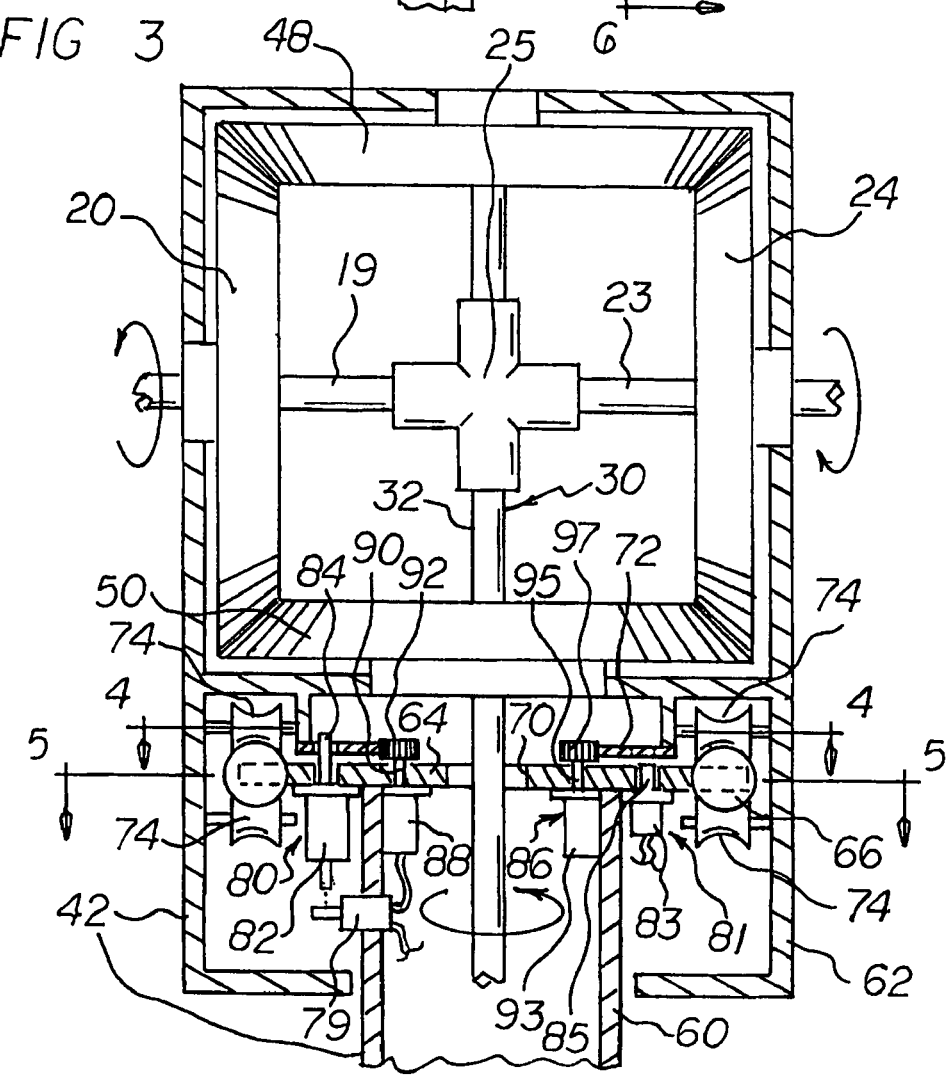
FIG. 3 is an enlarged view of the portion of the embodiment of the invention shown in FIG. 1 that is contained in circled area 3 of FIG. 1.
Figure 4:
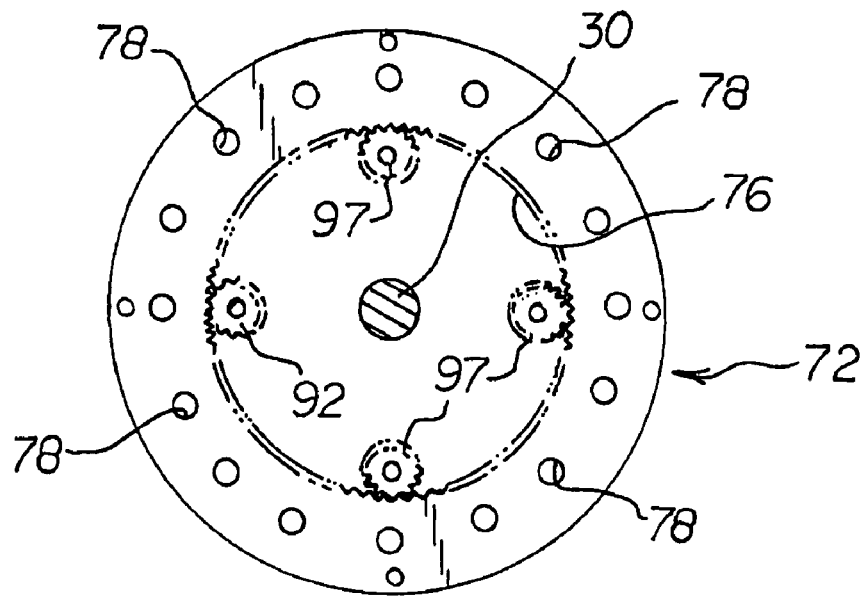
FIG. 4 is a partial cross-sectional view of the portion of the embodiment of the wind driven electric generator apparatus shown in FIG. 3 taken along line 4-4 thereof.
Figure 5:
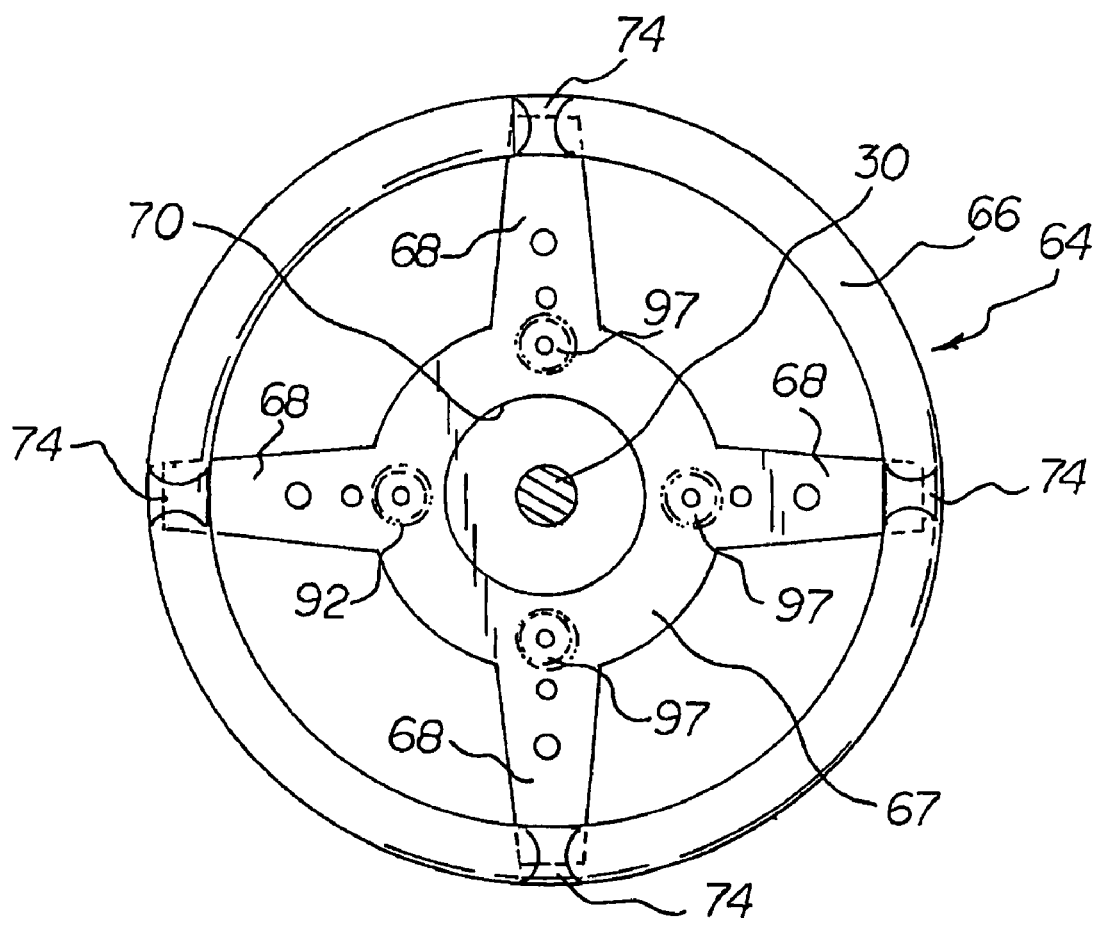
FIG. 5 is a partial cross-sectional view of the portion of the embodiment of the wind driven electric generator apparatus shown in FIG. 3 taken along line 5-5 thereof.

The first power shaft gear assembly includes a first power shaft ring gear 48 spaced apart from a second power shaft ring gear 50, and the first propeller-driven ring gear 20 and the second propeller-driven ring gear 24 are connected between the first power shaft ring gear 48 and the second power shaft ring gear 50. The first propeller-driven ring gear 20, the second propeller-driven ring gear 24, the first power shaft ring gear 48, and the second power shaft ring gear 50 can be bevel gears, as shown in FIG. 2.

Figure 10:
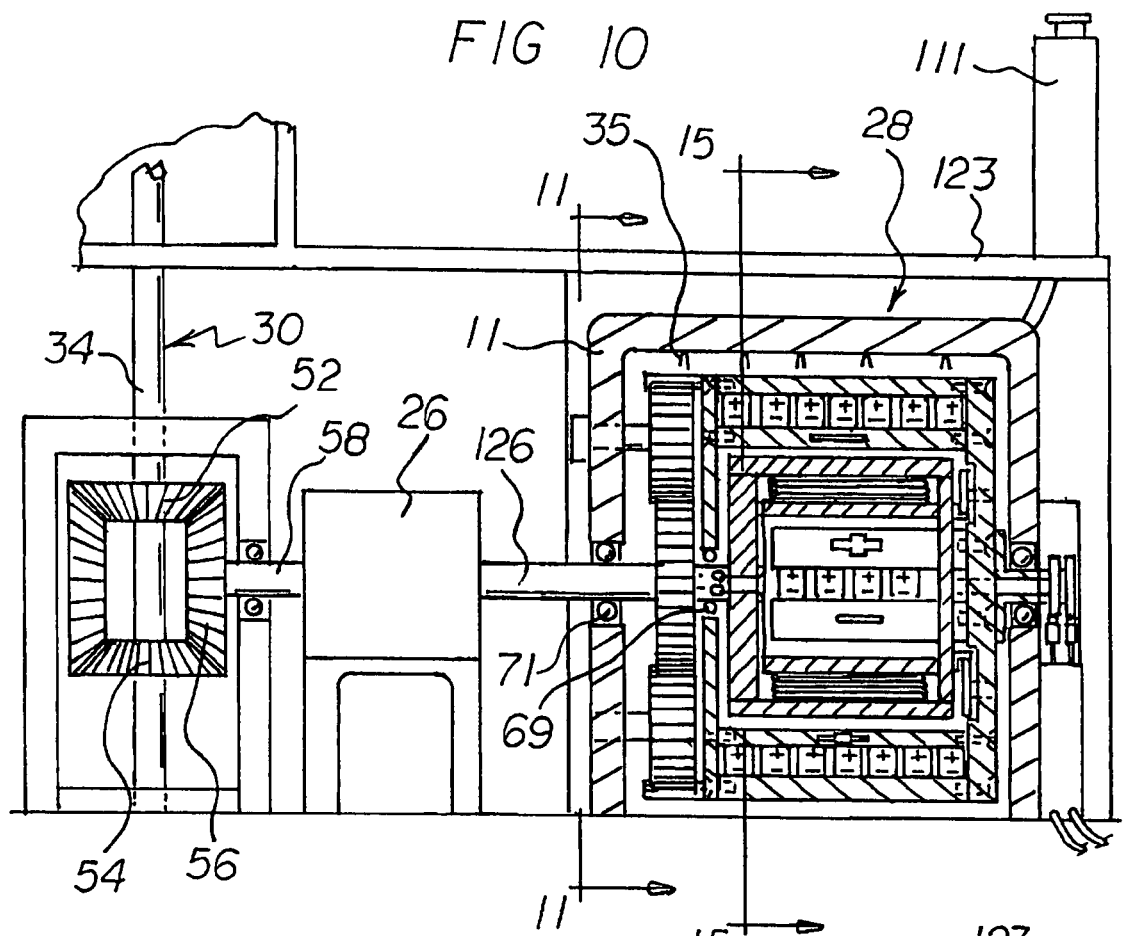
FIG. 10 is an enlarged view of the portion of the embodiment of the invention shown in FIG. 1 that is contained in circled area 10 of FIG. 1.
Figure 11:
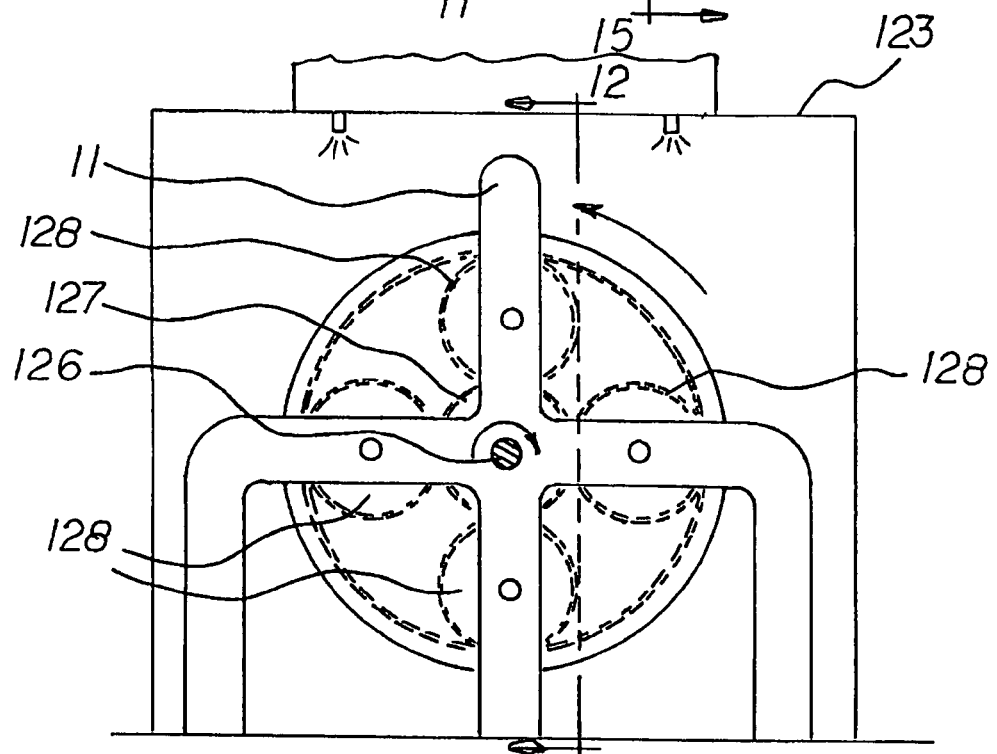
FIG. 11 is a cross-sectional view of the embodiment of the invention shown in FIG. 10, taken along line 11-11 wherein a portion of the electric generator is shown.
Figure 12:
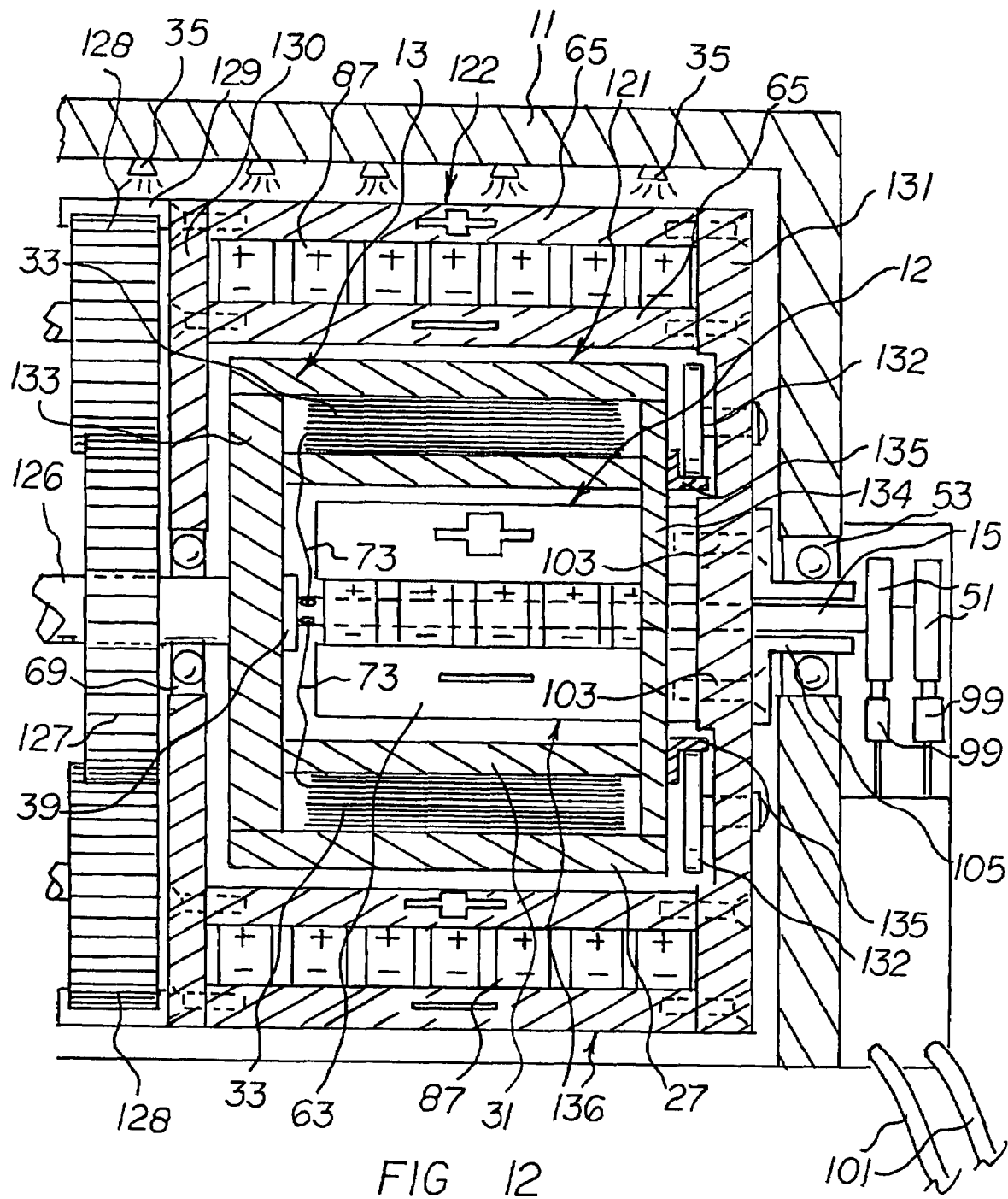
FIG. 12 is a cross-sectional view of the embodiment of the invention shown in FIG. 11, taken along line 12-12 wherein another portion of the electric generator is shown.
Figure 13:
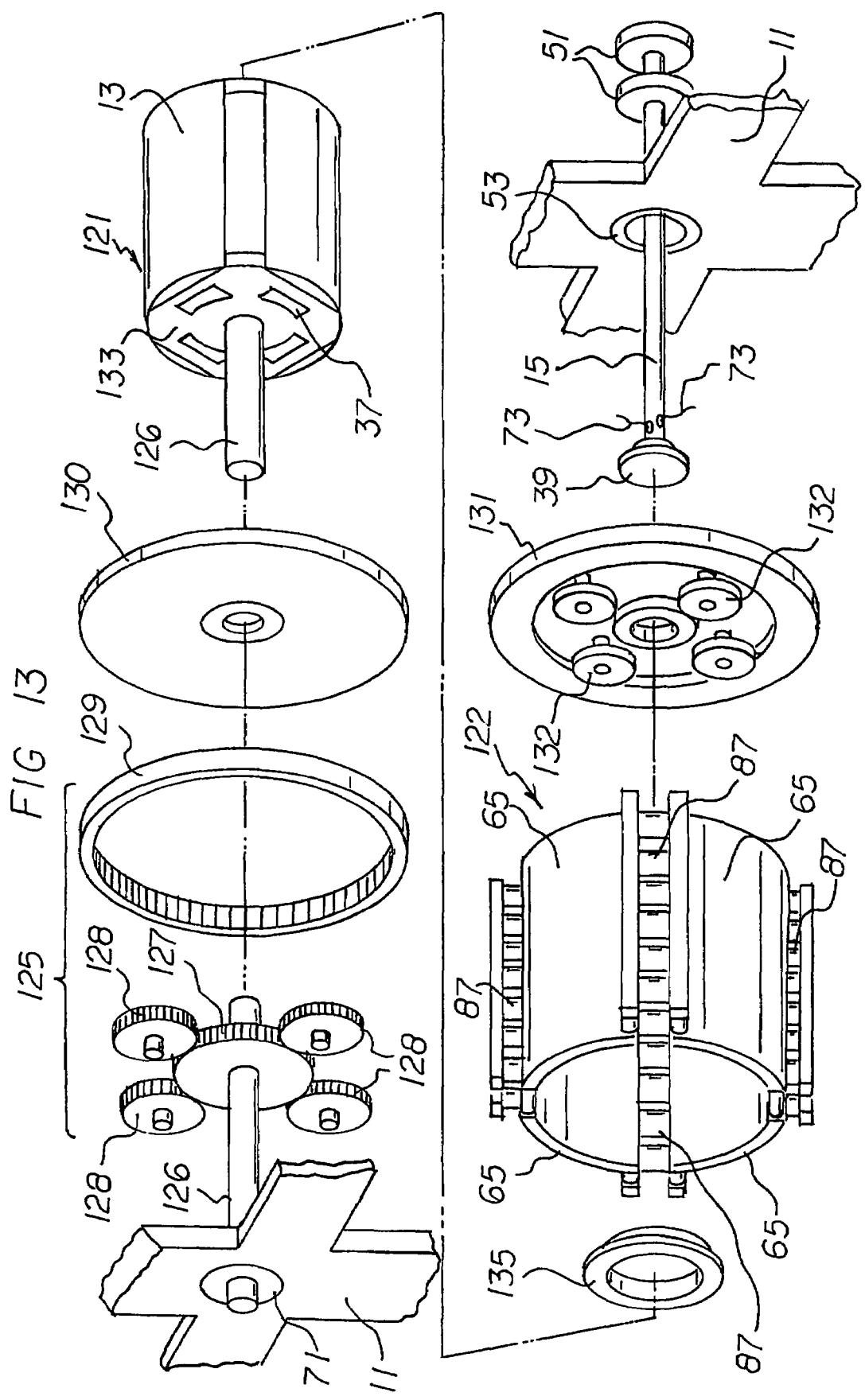
FIG. 13 is an exploded perspective view of a portion of the invention which includes an armature assembly support structure, a rotation/counter-rotation drive assembly, a rotatable interior armature assembly, and a counter-rotatable armature assembly; wherein the center counter-rotatable armature assembly portion of the counter-rotatable armature assembly is omitted for purposes of brevity.
Figure 14:
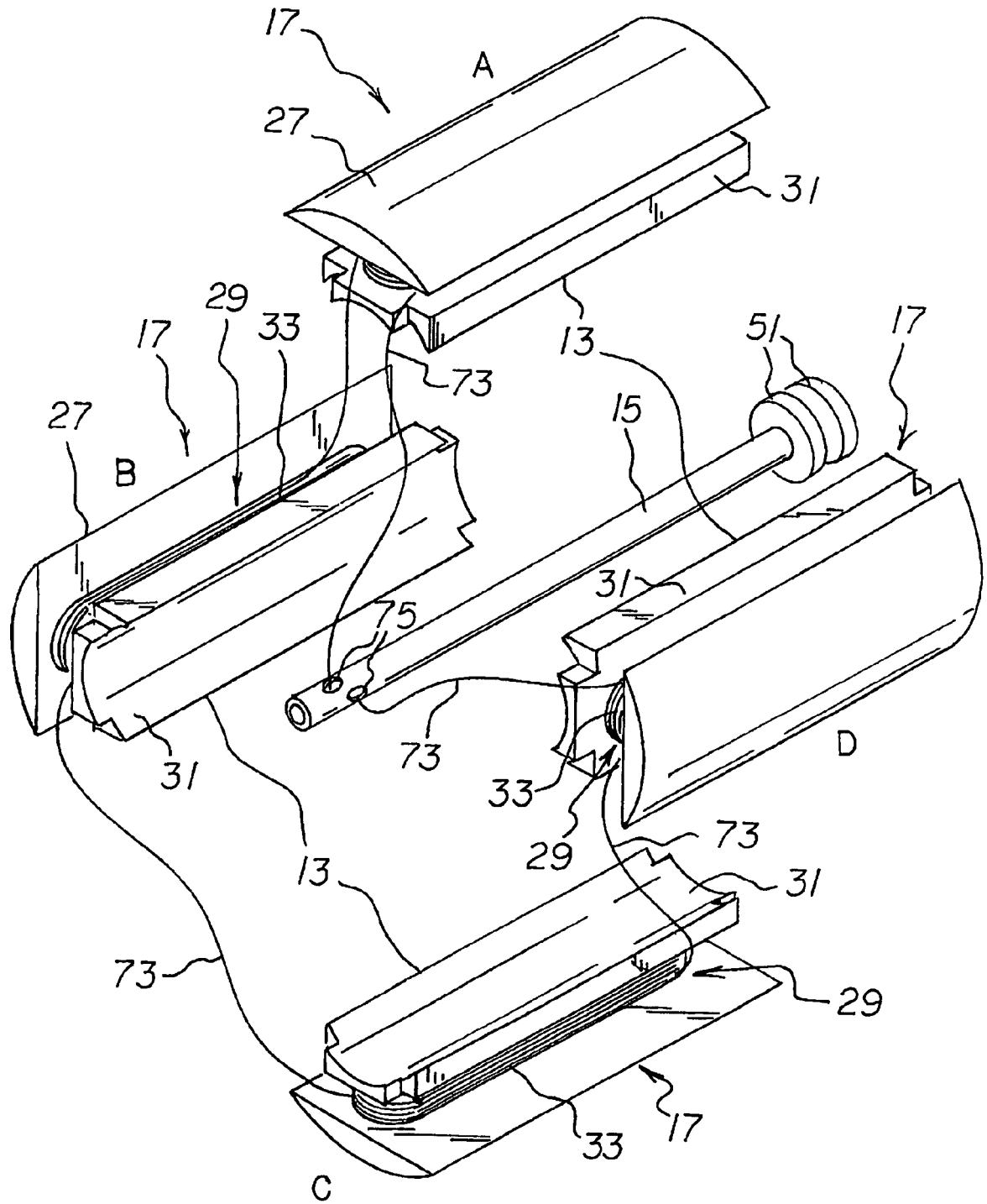
FIG. 14 is an exploded perspective view of a rotatable interior armature assembly which illustrates wiring connections and an inner tubular axle.
Figure 15:
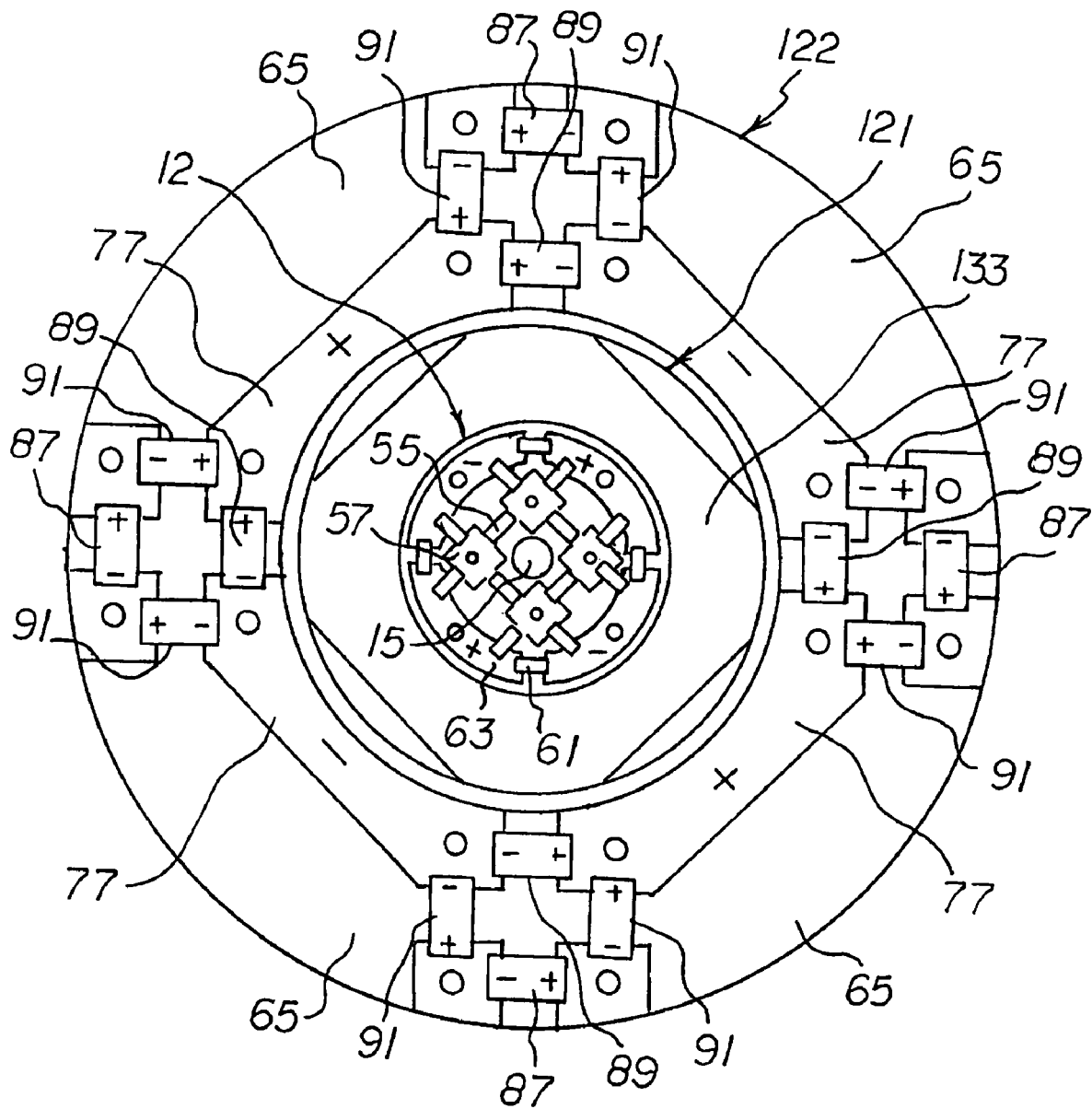
FIG. 15 is an enlarged cross-sectional view of the embodiment of the invention shown in FIG. 10, taken along line 15-15 thereof.
Figure 18:
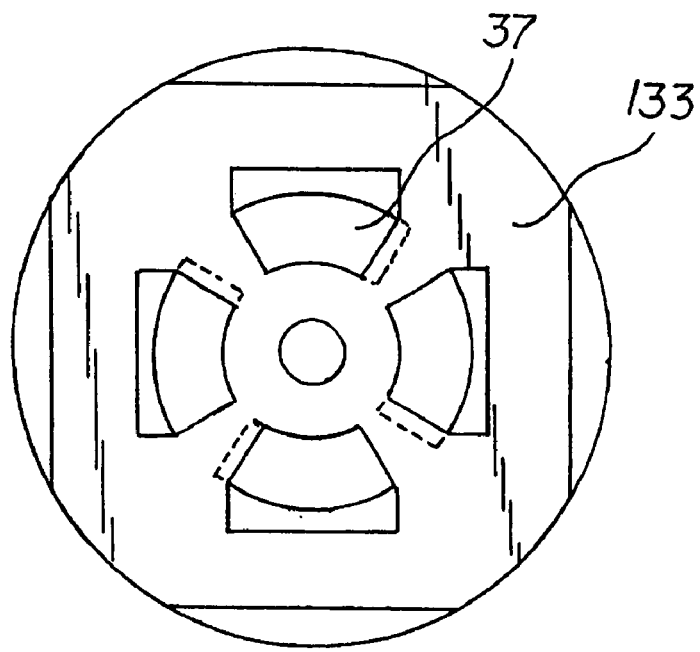
FIG. 18 is an enlarged front view of the interior armature front wall of the rotatable interior armature assembly.
Figure 19:
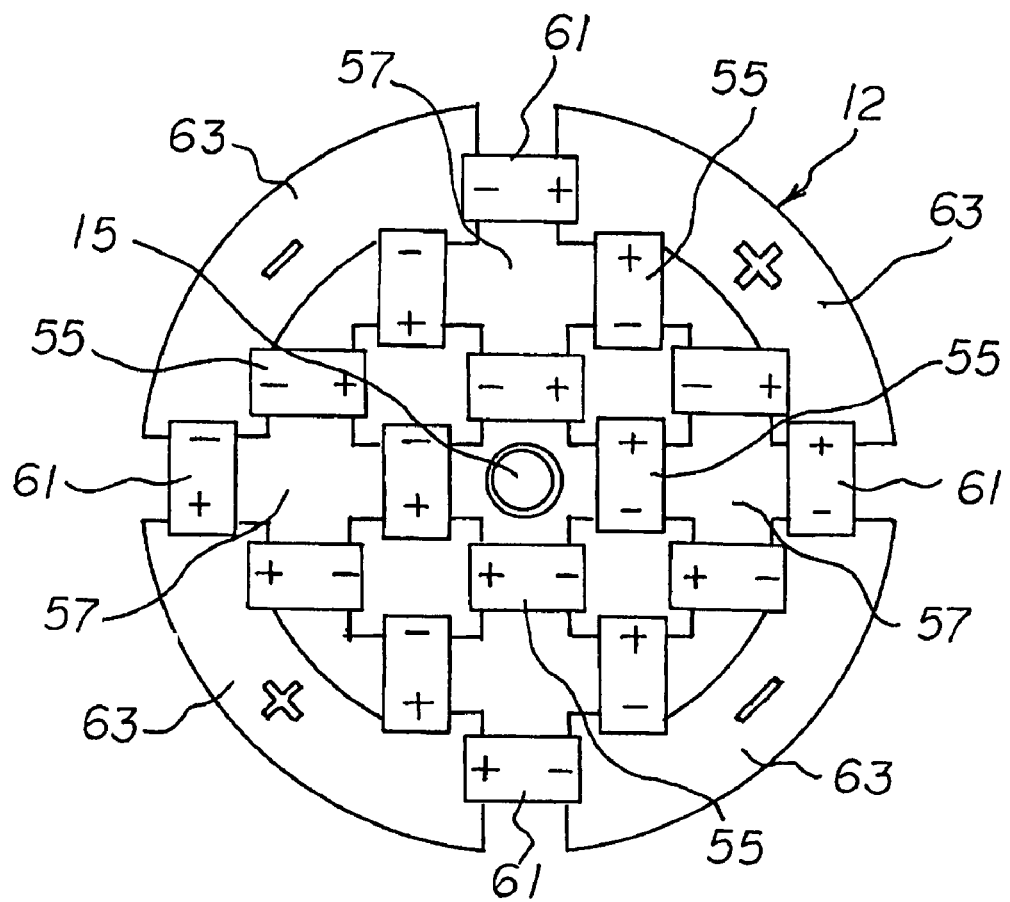
FIG. 19 is an enlarged schematic front view of the center counter-rotatable armature assembly portion of FIG. 15.
Figure 20:
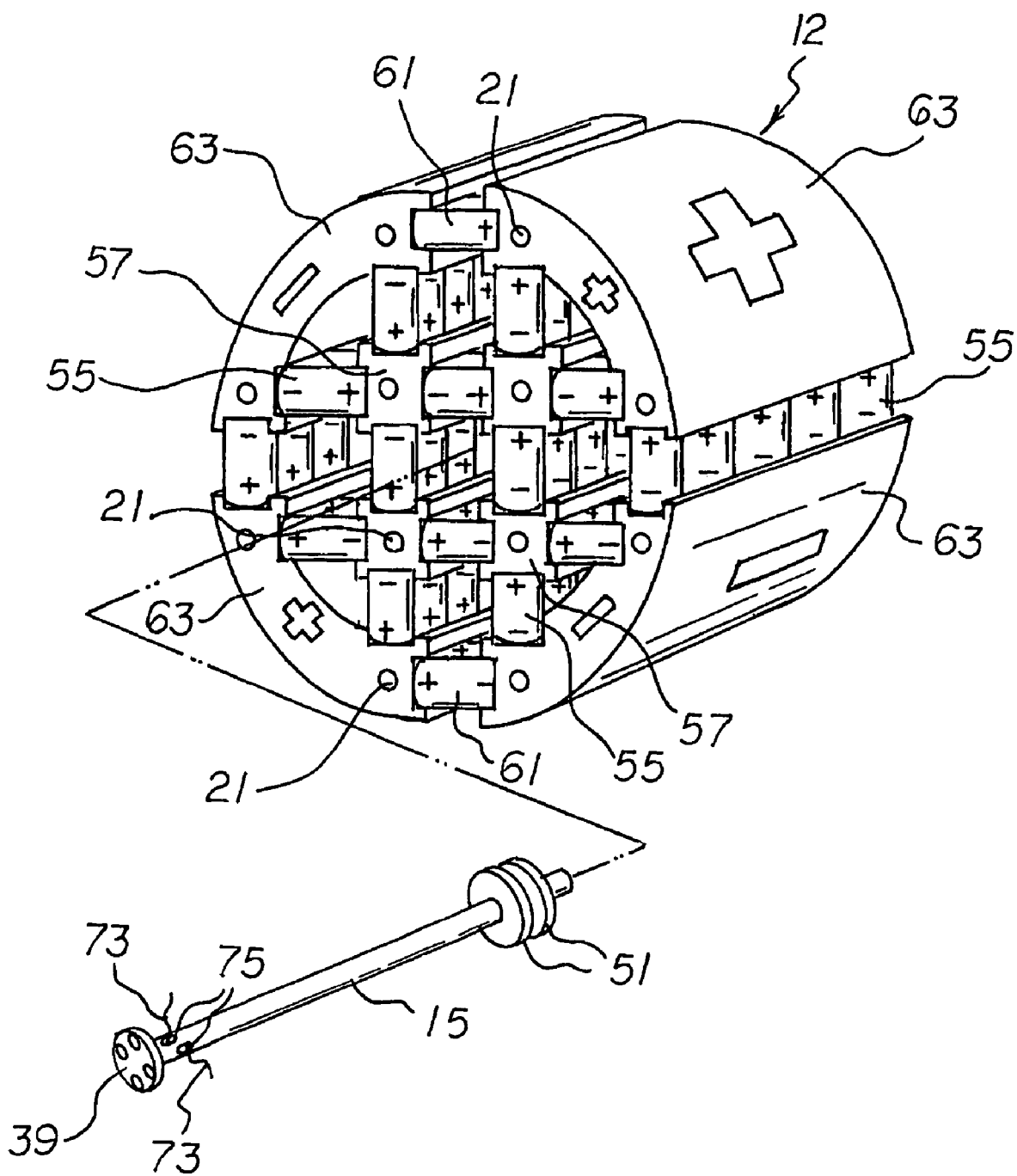
FIG. 20 is perspective view of the center counter-rotatable armature assembly portion shown in FIGS. 15 and 19, also showing the inner axle and fastener-reception channels.
Figure 21:
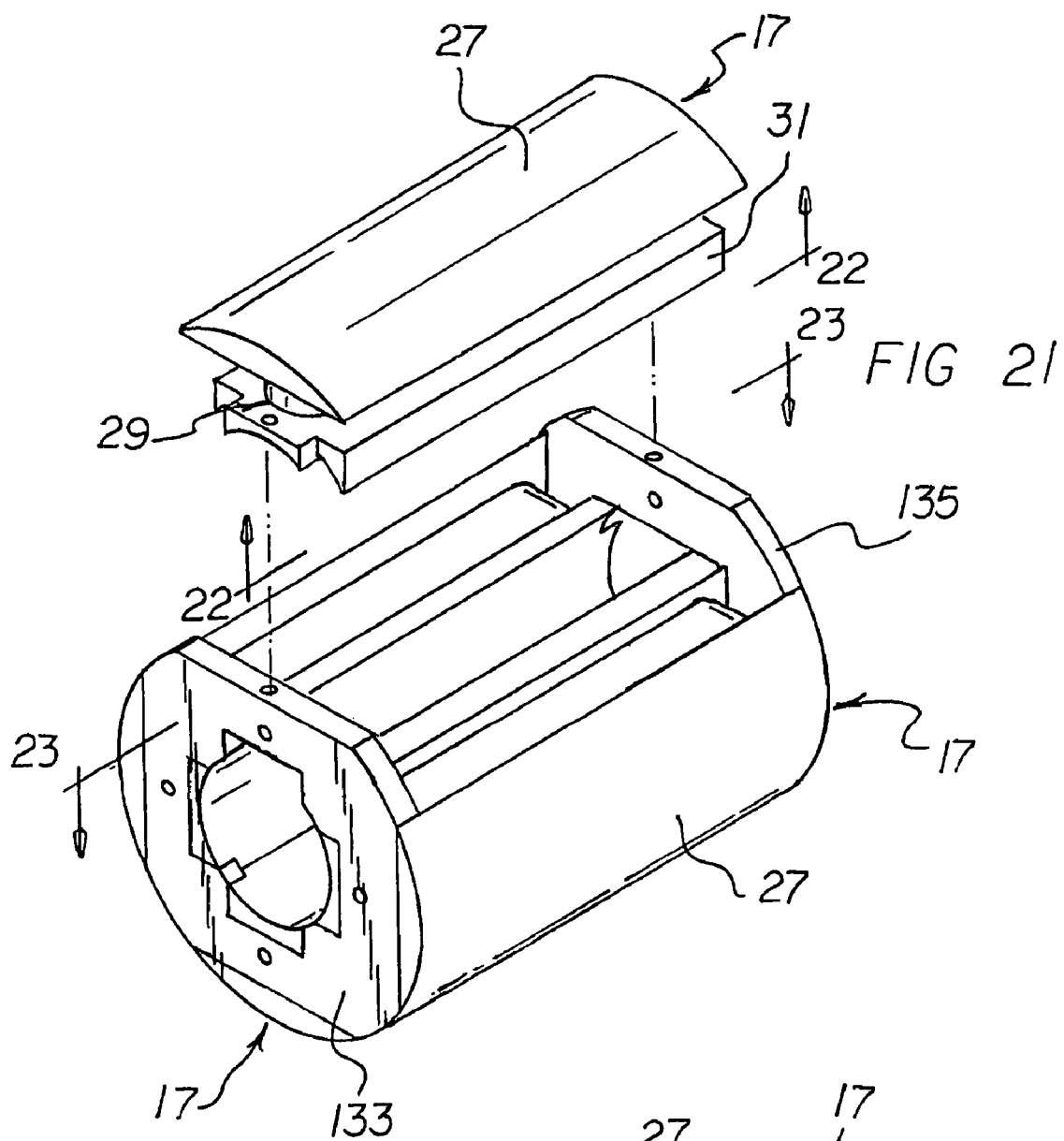
FIG. 21 is a partially exploded perspective view showing the rotatable interior armature assembly.
Figure 22:
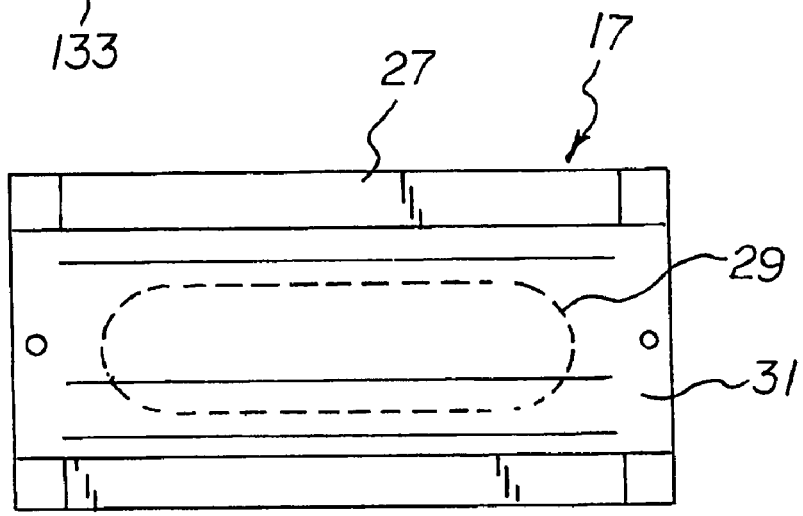
FIG. 22 is bottom view of one portion of the rotatable interior armature assembly shown in FIG. 21, taken along line 22-22 thereof, wherein coiled wires extend along the center counter-rotatable armature assembly portion (not shown) so that they are coextensive with the flux field generated by the magnets arrayed in the center counter-rotatable armature assembly portion.

As shown in FIG. 10, the second power shaft gear assembly includes a third power shaft ring gear 52 spaced apart from a fourth power shaft ring gear 54, and the second power transmission system includes a first transmission-driving ring gear 56 connected between the third power shaft ring gear 52 and the fourth power shaft ring gear 54. A first transmission-driving shaft 58 is connected to the first transmission-driving ring gear 56, and a multi-speed transmission 26 is connected to the first transmission-driving shaft 58.

The first transmission housing 42 includes a stationary first transmission housing portion, and a rotatable second transmission housing portion 62 is supported by the stationary first transmission housing portion.

The stationary first transmission housing portion includes a stationary base portion 59, and a stationary support column 60 is supported by the stationary base portion 59.

The propeller unit orientation means are housed within the rotatable second transmission housing portion 62 and are supported by the stationary first transmission housing portion 60. The propeller unit orientation means include a stationary track-containing base member 64 supported by the stationary first transmission housing portion 60. The stationary track-containing base member 64 includes a peripheral circular track portion 66. Track-supporting radial spoke portions 68 are connected to the peripheral circular track portion 66, and an inner base ring 67 is connected to the track-supporting radial spoke portions 68. A through-channel 70 is defined by the inner base ring 67, and the main power shaft 30 extends through the through-channel 70.

A rotatable ring member 72 supports the rotatable second transmission housing portion 62. The rotatable ring member 72 has a fixed connection with the rotatable second transmission housing portion 62, and the rotatable ring member 72 includes an internal ring gear 76 and a plurality of lock-pin-reception channels 78 arrayed in a circular array in the rotatable ring member 72. A set of track-reception rollers 74 are supported by the rotatable second transmission housing portion 62. The track-reception rollers 74 receive and support the peripheral circular track portion 66. The rotatable second transmission housing portion 62 is supported by the peripheral circular track portion 66.

An electrically-operated lock unit 80 is supported by the stationary track-containing base member 64. The electrically-operated lock unit 80 includes a solenoid portion 82 and a lock pin portion 84 controlled by the solenoid portion 82. The lock pin portion 84 is received in a selected lock-pin-reception channel 78. An electrically-operated rotation drive unit 86 is supported by the stationary track-containing base member 64. The electrically-operated rotation drive unit 86 includes a rotational drive motor 88 supported by the stationary track-containing base member 64. A rotational drive shaft 90 is connected to the rotational drive motor 88, and a rotational drive gear 92 is connected to the rotational drive shaft 90. The rotational drive gear 92 engages the internal ring gear 76 for rotating the first rotating propeller unit 14, the second rotating propeller unit 16, arid the rotatable second transmission housing portion 62 around the stationary first transmission housing portion 60.

In addition to the rotational drive motor 88, the rotational drive shaft 90, and the rotational drive gear 92, idler (unpowered gears) may also be engaged with the internal ring gear 76 to provide stable and smooth operation of the internal ring gear 76. More specifically, three idler gear assemblies can be employed. Each of the idler gear assemblies includes a idler housing portion 93, an idler shaft 95 extending out from the idler housing portion 93, and an idler gear 97 attached to the idler shaft 95 and engaging the internal ring gear 76.

Preferably, a reception-channel sensor assembly 81, supported by the stationary track-containing base member 64, is provided for sensing the lock-pin-reception channels 78 in the rotatable ring member 72. The reception-channel sensor assembly 81 includes a sensor housing portion 83 and a sensor probe portion 85 extending outward from the sensor housing portion 83 toward the lock-pin-reception channel 78. By sensing the lock-pin-reception channels 78 with the reception-channel sensor assembly 81, the sensing information is sent to the remote computer (not shown), and the remote computer is able to determine the angular orientation of the counter-rotating propeller units.

To rotate the rotatable second transmission housing portion 62, the first rotating propeller unit 14, and the second rotating propeller unit 16 around the stationary first transmission housing portion 60, the electrically-operated lock unit 80 is actuated so that the lock pin portion 84 is retracted out from its associated lock-pin-reception channel 78 by the solenoid portion 82. To do so, a normally open solenoid-operated switch 79 is closed, causing the solenoid portions 82 of the electrically-operated lock units 80 and the rotational drive motors 88 of the electrically-operated rotation drive units 86 to operate. Then, the rotational drive motor 88 is operated to rotate the rotational drive shaft 90 which rotates the rotational drive gear 92. Preferably, the rotational drive motor 88 is controlled by a remote computer.

As the rotational drive gear 92 is rotated, the rotational drive gear 92 engages the internal ring gear 76 and rotates rotatable ring member 72, and the rotatable ring member 72 rotates the rotatable second transmission housing portion 62 such that the track-reception rollers 74 roll along the peripheral circular track portion 66. Another way of describing the action of the rotatable ring member 72 with respect to the stationary track-containing base member 64 is that the rotational drive gear 92 causes the rotatable ring member 72 to "walk" around the stationary track-containing base member 64. As the rotatable second transmission housing portion 62 is rotated, the first rotating propeller unit 14 and the second rotating propeller unit 16 rotate around the main power shaft 30, whereby the first rotating propeller unit 14 and the second rotating propeller unit 16 are reoriented with respect to the direction of the wind.

More specifically, the propeller unit orientation means are controlled to adjust the orientation of the pair of counter-rotating propeller units so that the pair of counter-rotating propeller units will rotate at optimum speed. That is, if the propeller speed is too high, as sensed by a propeller rotation speed sensor 94, which is preferably an optical sensor, which monitors the speed of a speedometer wheel 96, then the remote computer will control rotation of the pair of counter-rotating propeller units to reduce the speed of rotation of the pair of counter-rotating propeller units. Conversely, if the propeller speed is too low, as indicated by the speedometer wheel 96 and as sensed by the propeller rotation speed sensor 94, then the remote computer will control rotation of the pair of counter-rotating propeller units to increase the speed of rotation of the pair of counter-rotating propeller units.

Once the first rotating propeller unit 14 and the second rotating propeller unit 16 have been reoriented with respect to the wind, the solenoid portion 82 is deactuated, and the lock pin portion 84 returns to another selected lock-pin-reception channel 78 in the rotatable ring member 72. In this way, the first rotating propeller unit 14, the second rotating propeller unit 16, and the rotatable second transmission housing portion 62 are locked into another selected rotational position with respect to the main power shaft 30. The orientation of the first rotating propeller unit 14 and the second rotating propeller unit 16 is controlled so that the first propeller blades 18 and the second propeller blades 22 do not spin too rapidly.

As shown in FIGS. 6-7 more specifically, for each respective counter-rotating propeller unit, the self-adjusting propeller blade angle adjustment means include respective intermediate gearing connected to a respective propeller shaft. An intermediate gearing housing 98 is provided for housing the intermediate gearing. The intermediate gearing housing 98 is supported by the rotatable second transmission housing portion 62, and respective propeller blades are connected to the intermediate gearing.

Preferably, the self-adjusting propeller blade angle adjustment means further include blade bearings 100 connected to the intermediate gearing housing 98 for receiving propeller blade shafts 102. A blade angle rotation gear 104 is connected to a proximal end of each propeller blade shaft 102. A pair of blade angle adjustment ring gears 106 are housed in the intermediate gearing housing 98 for meshing with the blade angle rotation gears 104 therebetween the pair of blade angle adjustment ring gears 106. The blade angle adjustment ring gears 106 are supported by a ring gear support shaft 107, which is supported by ball bearings 109.

Bias force means are connected to the blade angle rotation gears 104 for biasing the blade angle rotation gears 104 with respect to the blade angle adjustment ring gears 106, thereby controlling the blade angle rotation gears 104 and the propeller blade angles of the propeller blades. The bias force means include a wire spring 108. More specifically, the wire spring 108 keeps the propeller blades in default blocking position. As the wind picks up, the propeller blades twist around their longitudinal axes until the limit stop prevents further angular rotation of the propeller blades. In addition, alternatively, the bias force means can be in the form of a torsion bar.

The self-adjusting propeller blade angle adjustment means further include propeller blade mounting blocks 110 contained in the propeller blades. The propeller blade mounting blocks 110 receive distal ends of the propeller blade shafts 102, and the mounting bolts 112 are provided for securing the propeller blade shafts 102 to the propeller blade mounting blocks 110. Jam lock pins 114 are provided to lock respective propeller blade shafts 102 to the blade angle rotation gears 104, which stops angular rotation of the propeller blades and prevent propeller blade flutter. Jam nuts 116 are provided to apply pressure to the jam lock pins 114.

The operation of the self-adjusting propeller blade angle adjustment means is as follows. As the wind picks up speed, it presses on the trailing edges of the propeller blades, causing the propeller blades to rotate against the bias pressure of the wire spring 108. If the wind speed is high enough, the propeller blades will change their propeller blade angles, making the propeller blades more efficient. Because the propeller blade shafts 102 work together with their engagement with the blade angle adjustment ring gear 106, all of the propeller blades assume substantially the same alignment angles. The normal wind conditions for the area, in which the counter-rotating propeller units are used, determine the thickness of the wire spring 108 and how easily the propeller blade angles change.

Alternatively, there is a way to use a helicopter swash plate to change the propeller blade angles under power, but such a way is more expensive and complicated without additional benefits.

Each propeller blade has the same openings for the propeller blade shafts 102. As a result, each propeller blade can be used as either a front rotating or a rear counter-rotating propeller blade just by reversing the orientation of the propeller blade in the respective propeller blade mounting block 110.

FIGS. 6 and 7 show the propeller blades for rotation in a first rotating propeller unit 14. For rotation in the second rotating propeller unit 16, the orientation of the propeller blades are reversed. To achieve this reversal, the jam nuts 116 are loosened, the blade angle rotation gears 104 are rotated outward, the propeller blade shafts 102 are pulled and rotated so that the jam lock pins 114 are placed into their new positions, and the jam nuts 116 are retightened to apply pressure on the jam lock pins 114.

As shown in FIGS. 8-9, winglets 118 can be attached to respective end tips of the propeller blades. In this respect, the respective ends of the propeller blades include winglet-reception wells for receiving winglet mounting brackets 120 for the winglets 118. The winglets 118 are airfoils that reduce turbulence at the tips of the propeller blades.

A pair of weather stations 40 can be mounted on front ends of the pair of counter-rotating propeller units. Each of the weather stations 40 can include a station-mounting shaft 41 which is connected to a hub portion 43 of a respective counter-rotating propeller unit.

Each of the pair of weather stations 40 is preferably free-swing mounted on respective hub portions of the pair of counter-rotating propeller units. Each of the weather stations 40 includes a station frame 47, and each station frame 47 can support a small, wind driven electric generator which also acts as an anemometer 45. Also, the weather stations 40 can support a wind direction sensor 49, such as a weather vane. Each of the pair of weather stations 40 can also include a lower long end box portion 44 which serves as a ballast weight or counterweight to stabilize the respective weather station 40. The lower long end box portion 44 can house rechargeable batteries and a transmitter to transmit weather information to a remote computer in a wireless manner. The transmitter has an antenna 46. The remote computer reads the weather information transmitted from the pair of weather stations 40, and the remote computer includes software programming for making decisions for controlling the multi-speed transmission and the propeller unit orientation means.

Preferably, the mechanical-energy-to-electrical-energy conversion means include an electric generator 28. As shown in FIG. 1, a plurality of multi-speed transmissions 26 and electric generators 28 can be driven by the apparatus of the invention.

The electric generator 28 includes a generator housing 123, an armature assembly support structure 11 housed within the generator housing 123, and a rotation/counter-rotation drive assembly 125 supported by the armature assembly support structure 11 and connected to the second power transmission system. A rotatable interior armature assembly 121 is connected to the rotation/counter-rotation drive assembly 125 and is supported by the armature assembly support structure 11. A counter-rotatable armature assembly 136 is spaced apart from and surrounds a portion of the rotatable interior armature assembly 121. The counter-rotatable armature assembly 136 is supported by the armature assembly support structure 11 and is connected to the rotation/counter-rotation drive assembly 125. A drive-shaft-to-support-structure roller bearing 71 is provided between the generator drive shaft 126 and the armature assembly support structure 11.

As shown in FIGS. 10-24, an electric generator 28 includes a generator housing 123, an armature assembly support structure 11 housed within the generator housing 123, a rotation/counter-rotation drive assembly 125 supported by the armature assembly support structure 11 and connected to the second power transmission system, a rotatable interior armature assembly 121 connected to the rotation/counter-rotation drive assembly 125 and supported by the armature assembly support structure 11, a counter-rotatable armature assembly 136 spaced apart from and surrounding a portion of the rotatable interior armature assembly 121, wherein the counter-rotatable armature assembly 136 is supported by the armature assembly support structure 11 and is connected to the rotation/counter-rotation drive assembly 125.

The counter-rotatable armature assembly 136 includes a counter armature rear wall 131 and a counter armature front wall 130. The rotatable interior armature assembly 121 includes a interior armature front wall 133 and a interior armature rear wall 134. The interior armature front wall 133 and interior armature rear wall 134 are made from non-ferrous metals or other non-ferromagnetic material. The counter armature front wall 130 includes a drive-shaft-to-front-wall roller bearing 69.

The interior armature front wall 133 and the interior armature rear wall 134 include coolant flow-through channels 37. The coolant flow-through channels 37 can have coolant scooping portions for scooping coolant for facilitating the flow of coolant through the coolant flow-through channels 37.

A rotatable armature-to-armature bearing assembly is connected between the rotatable interior armature assembly 121 and the counter-rotatable armature assembly 136. Preferably, the rotatable armature-to-armature bearing assembly includes a plurality of rollers 132 supported by the counter armature rear wall 131. A roller-reception flange 135 is supported by the interior armature rear wall 134. The roller-reception flange 135 receives the rollers 132, thereby permitting the counter-rotatable armature assembly 136 and the rotatable interior armature assembly 121 to rotate simultaneously in opposite directions from each other. Such simultaneous rotation provides intensive breaking of magnetic lines of force.

More specifically, the rotation/counter-rotation drive assembly 125 includes a generator drive shaft 126 connected to the second power transmission system. The generator drive shaft 126 is connected to the rotatable interior armature assembly 121 for driving the rotatable interior armature assembly 121 in a first rotational direction. A generator sun gear 127 is connected to the generator drive shaft 126. A plurality of generator planetary gears 128 are connected to the generator sun gear 127. A generator ring gear 129 encircles and is connected with the generator planetary gears 128, wherein the generator ring gear 129 is in contact with a front wall 130 of the counter-rotatable armature assembly 136 for driving the counter-rotatable armature assembly 136 in a second rotational direction which is counter-rotational to the first rotational direction.

Preferably, a fluid coolant system supported by the generator housing 123 or the armature assembly support structure 11 for cooling the counter-rotatable armature assembly 136 and the rotatable interior armature assembly 121. The fluid coolant system includes coolant spray nozzles 35 supported by the generator housing 123 or by the armature assembly support structure 11. In addition, the fluid coolant system includes a radiator 111 for cooling the coolant.

More specifically, for cooling the rotatable interior armature assembly 121 and counter-rotatable armature assembly 136, coolant is sprayed from the coolant spray nozzles 35 and flows over the rotatable interior armature assembly 121 and the counter-rotatable armature assembly 136. Also, coolant flows through the coolant flow-through channels 37 and contacts the inner core magnet array 12.

Preferably, the rotatable interior armature assembly 121 includes a pole and coil array 13 which is surrounded by the counter-rotatable armature assembly 136. An interior armature front wall 133 and an interior armature rear wall 134 support the pole and coil array 13. An inner tubular axle 15 is supported by the interior armature front wall 133. The inner tubular axle 15 includes wire-reception channels 75 for receiving wires 73 from the pole and coil array 13. The wires 73 are connected to rotating electrical contacts which are connected to the inner tubular axle 15. The inner tubular axle 15 is connected to the inside surface of the interior armature front wall 133 by an axle reception bracket 39 which is connected to the interior armature front wall 133 by fasteners, such as screws or bolts.

The counter-rotatable armature assembly 136 includes a peripheral counter-rotatable armature assembly portion 122 which jackets the outside of the pole and coil array 13. The counter-rotatable armature assembly 136 also includes a center counter-rotatable armature assembly portion 12 which extends into an interior portion of the pole and coil array 13.

More specifically, the peripheral counter-rotatable armature assembly portion 122 includes a counter armature front wall 130, a counter armature rear wall 131, and a plurality of peripheral outer shell segments 65 sandwiched between the counter armature front wall 130 and the counter armature rear wall 131. A plurality of outer-shell-to-outer-shell magnets 87 are interconnected between adjacent peripheral outer shell segments 65. A plurality of peripheral inner shell segments 77 are adjacent to the peripheral outer shell segments 65, and a plurality of inner-shell-to-inner-shell magnets 89 are interconnected between adjacent peripheral inner shell segments 77. A plurality of outer-shell-to-inner-shell magnets 91 are interconnected between adjacent peripheral outer shell segments 65 and peripheral inner shell segments 77.

Preferably, the center counter-rotatable armature assembly portion 12 includes a plurality of center individual magnets 55. A plurality of center magnet interconnector members 57 are connected between the center individual magnets 55 and a plurality of shell-to-shell magnets 61. A plurality of center assembly shell segments 63 are connected to the shell-to-shell magnets 61 and a portion of the center individual magnets 55. The center individual magnets 55 are arrayed in a plurality of positive-pole-to-negative-pole arrangements, and the center assembly shell segments 63 are arrayed in a positive-pole-to-negative-pole arrangement around the array of the center individual magnets 55.

The arrangement of the center individual magnets 55 to each other and the arrangement of the center assembly shell segments 63 to each other and to the center individual magnets 55 provide for intense magnetic fields in and around the rotatable interior armature assembly 121, causing a substantial voltage to be generated in the wire coils 33 and conducted through the wires 73 to the electrical contact slipper rings 51, to the conductive pickups 99, and to the conductors 101 feeding into an electrical grid or an electrical device electrically connected to the conductors 101.

The center counter-rotatable armature assembly portion 12 is connected to the interior armature rear wall 134 with fasteners 103. More specifically, the fasteners 103 extend through the counter armature rear wall 131 into the center assembly shell segments 63.

Principles of using the inner individual magnets 55, the inner magnet interconnector members 57, the shell-to-shell magnets 61, the center assembly shell segments 63, the peripheral outer shell segments 65, the outer-shell-to-outer-shell magnets 87, the peripheral inner shell segments 77, the inner-shell-to-inner-shell magnets 89, and the outer-shell-to-inner-shell magnets 91 are set forth in U.S. Pat. Nos. 5,879,549 and 6,426,000 by the present inventor, and U.S. Pat. Nos. 5,879,549 and 6,426,000 are hereby incorporated herein by reference, for their disclosure of magnet arrays employing a plurality of cylindrical magnet units 35.

Also, preferably, the inner individual magnets 55, the shell-to-shell magnets 61, the outer-shell-to-outer-shell magnets 87, the inner-shell-to-inner-shell magnets 89, and the outer-shell-to-inner-shell magnets 91 are cylindrical magnets such as disclosed in U.S. Pat. Nos. 5,879,549 and 6,426,000.

In the drawing Figures for the present invention, respective positive (+) and negative (−) magnetic polarities are shown on the various cylindrical magnets, the various center assembly shell segments 63, the various peripheral outer shell segments 65, and the various peripheral inner shell segments 77, in accordance with the principles disclosed in U.S. Pat. Nos. 5,879,549 and 6,426,000.

More specifically, the pole and coil array 13 includes a plurality of pole and coil units 17. The pole and coil units 17 are arrayed as opposing pairs of pole and coil units 17. In the drawings, there are two pairs of opposed pole and coil units 17 for a total of four pole and coil units 17. It is also contemplated that one pair of pole and coil units 17, three pairs of pole and coil units 17, and four or more pairs of pole and coil units 17 can be employed.

Preferably, each pole and coil unit 17 includes a top pole portion 27, a wire-reception post 29 extending downward from the top pole portion 27, a bottom pole portion 31 connected to the wire-reception post 29, and a quantity of wire coiled around the wire-reception post 29 to form a wire coil 33 mounted on the wire-reception post 29.

A continuous quantity of wire extends from each wire coil 33 in each pole and coil unit 17 through the inner tubular axle 15 to rotating electrical contacts connected to the inner tubular axle 15. Preferably, the rotating electrical contacts are in a form of electrical contact slipper rings 51. The electrical contact slipper rings 51 are in electrical contact with conductive pickups or brushes 99 which are electrically connected to conductors 101 which can be connected to an electrical power grid or to a single device that is powered by electrical power.

The armature assembly support structure 11 includes a roller bearing 53. The peripheral counter-rotatable armature, assembly portion 122 includes a rotatable bearing sleeve 105 connected to the counter armature rear wall 131. The rotatable bearing sleeve 105 is received in the roller bearing 53, and the inner tubular axle 15 is received in the rotatable bearing sleeve 105. The rotatable bearing sleeve 105 can be connected to the counter armature rear wall 131 with the same fasteners 103 that are used to connect the center counter-rotatable armature assembly portion 12 to the counter armature rear wall 131.

The wire-reception post 29 and the wire coil 33 are substantially coextensive with the top pole portion 27 and the bottom pole portion 31 so that the wire coil 33 is substantially coextensive with magnetic flux generated by the inner core magnet array 12.

By the arrangement of the armature assembly support structure 11, the drive-shaft-to-front-wall roller bearing 69, the roller bearing 53, the outer diameter of the rotatable interior armature assembly 121, and the outer diameter of the counter-rotatable armature assembly 136, the rotatable interior armature assembly 121 and the counter-rotatable armature assembly 136 are freely rotatable independently of each other and without touching or interfering with each other.

The electric generator can be either a DC electric generator or an AC electric generator, such, as an alternator. Hence, the term "generator" as used herein and in the annexed claims is to be construed broadly to encompass either a generator or an alternator. The electric generator can be hooked up to an electrical grid. If desired, the electric generator can be used to drive a liquid cooled DC motor apparatus, by the present inventor, such as disclosed in U.S. Pat. No. 6,838,799, incorporated herein by reference.

In accordance with another aspect of the invention, a wind energy conversion apparatus is comprised of wind-energy-reception means for receiving wind energy, wherein the wind-energy-reception means include a pair of counter-rotating propeller units placed back to back with each other, wind-energy-to-mechanical-energy conversion means, connected to the wind-energy-reception means, for converting wind energy into mechanical energy, wherein the wind-energy-to-mechanical-energy conversion means include a first power transmission system connected to the pair of counter-rotating propeller units, a second power transmission system connected to the first power transmission system, and a first transmission housing 42 for housing the first power transmission system, propeller unit orientation means, supported by the first transmission housing 42, for orienting the pair of counter-rotating propeller units with respect to wind that is sensed, and self-adjusting propeller blade angle adjustment means, supported by the pair of counter-rotating propeller units, for adjusting propeller blade angles in response to wind that is sensed.

The components of the wind driven electric generator apparatus of the invention can be made from inexpensive and durable metal and plastic materials and electrical and magnetic components.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved wind driven electric generator apparatus that is low in cost, relatively simple in design and operation, and which may advantageously be used to include propeller unit orientation means. With the invention, an apparatus provides self-adjusting propeller blade angle adjustment means. With the invention, an apparatus provides a pair of counter-rotating propeller units. With the invention, an apparatus is provided which discloses electric generators and the like which include relatively large numbers of relatively small magnets. With the invention, an apparatus provides an electric generator that can double the rate of the breaking of the magnetic lines of flux without increasing the rate of rotation of a single rotating armature.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. An electric generator adapted to be connected to a power transmission system, comprising:
   a generator housing,
   an armature assembly support structure housed within said generator housing,
   a rotation/counter-rotation drive assembly supported by said armature assembly support structure and adapted to be coupled to said power transmission system,
   a rotatable interior armature assembly connected to said rotation/counter-rotation drive assembly and supported by said armature assembly support structure,
   a counter-rotatable armature assembly spaced apart from and surrounding a portion of said rotatable interior armature assembly, wherein said counter-rotatable armature assembly is supported by said armature assembly support structure and is connected to said rotation/counter-rotation drive assembly, and
   wherein said rotation/counter-rotation drive assembly includes:
   a generator drive shaft adapted to be connected to said power transmission system, wherein said generator drive shaft is connected to said rotatable interior armature assembly for driving said rotatable interior armature assembly in a first rotational direction,
   a generator sun gear connected to said generator drive shaft,
   a plurality of generator planetary gears connected to said generator sun gear,
   a generator ring gear encircling and connected with said generator planetary gears, wherein said generator ring gear is in contact with a front wall of said counter-rotatable armature assembly for driving said counter-rotatable armature assembly in a second rotational direction which is counter-rotational to said first rotational direction.

2. The apparatus of claim 1 wherein:
   said counter-rotatable armature assembly includes a counter armature rear wall and a counter armature front wall,
   said rotatable interior armature assembly includes a interior armature front wall and a interior armature rear wall.

3. The apparatus of claim 2 wherein said counter armature front wall includes a drive-shaft-to-front-wall roller bearing.

4. The apparatus of claim 1 wherein said interior armature front wall and said interior armature rear wall include coolant flow-through channels.

5. The apparatus of claim 1, further including:
a rotatable armature-to-armature bearing assembly connected between said rotatable interior armature assembly and said counter-rotatable armature assembly.

6. The apparatus of claim 5 wherein said rotatable armature-to-armature bearing assembly includes:
a plurality of rollers supported by said counter armature rear wall, and
a roller-reception flange supported by said interior armature rear wall, wherein said roller-reception flange receives said rollers, thereby permitting said counter-rotatable armature assembly and said rotatable interior armature assembly to rotate in opposite directions from each other.

7. The apparatus of claim 1, further including:
a fluid coolant system supported by said generator housing or said armature assembly support structure for cooling said counter-rotatable armature assembly and said rotatable interior armature assembly.

8. The apparatus of claim 7 wherein said fluid coolant system includes coolant spray nozzles supported by said generator housing or said armature assembly support structure.

9. The apparatus of claim 7 wherein said fluid coolant system includes a radiator for cooling the coolant.

10. The apparatus of claim 1 wherein said rotatable interior armature assembly includes:
a pole and coil array which is surrounded by said counter-rotatable armature assembly,
an interior armature front wall and an interior armature rear wall which support said pole and coil array, and
an inner tubular axle supported by said interior armature front wall, wherein said inner tubular axle includes wire-reception channels for receiving wires from said pole and coil array, wherein said wires, are connected to rotating electrical contacts connected to said inner tubular axle.

11. The apparatus of claim 10 wherein said counter-rotatable armature assembly includes:
a peripheral counter-rotatable armature assembly portion which jackets the outside of said pole and coil array, and
a center counter-rotatable armature assembly portion which extends into an interior portion of said pole and coil array.

12. The apparatus of claim 11 wherein said peripheral counter-rotatable armature assembly portion includes:
a counter armature front wall,
a counter armature rear wall,
a plurality of peripheral outer shell segments sandwiched between said counter armature front wall and said counter armature rear wall,
a plurality of outer-shell-to-outer-shell magnets interconnected between adjacent peripheral outer shell segments,
a plurality of peripheral inner shell segments adjacent to said peripheral outer shell segments,
a plurality of inner-shell-to-inner-shell magnets interconnected between adjacent peripheral inner shell segments, and
a plurality of outer-shell-to-inner-shell magnets interconnected between adjacent peripheral outer shell segments and peripheral inner shell segments.

13. The apparatus of claim 11 wherein said center counter-rotatable armature assembly portion includes:
a plurality of center individual magnets,
a plurality of center magnet interconnector members connected between said center individual magnets,
a plurality of shell-to-shell magnets, and
a plurality of center assembly shell segments connected to said shell-to-shell magnets and a portion of said center individual magnets,
wherein said center individual magnets are arrayed in a plurality of positive-pole-to-negative-pole arrangements, and
wherein said center assembly shell segments are arrayed in a positive-pole-to-negative-pole arrangement around said array of said center individual magnets.

14. The apparatus of claim 10 wherein said pole and coil array includes a plurality of pole and coil units.

15. The apparatus of claim 14 wherein said pole and coil units are arrayed as opposing pairs of pole and coil units.

16. The apparatus of claim 10 wherein each pole and coil unit includes:
a top pole portion,
a wire-reception post extending downward from said top pole portion,
a bottom pole portion connected to said wire-reception post, and
a quantity of wire coiled around said wire-reception post to form a wire coil mounted on said wire-reception post.

17. The apparatus of claim 16 wherein a continuous quantity of wire extends from each wire coil in each pole and coil unit through said inner tubular axle to rotating electrical contacts connected to said inner tubular axle.

18. The apparatus of claim 16 wherein said wire-reception post and said wire coil are substantially coextensive with said top pole portion and said bottom pole portion so that said wire coil is substantially coextensive with magnetic flux generated by said inner core magnet array.

19. The apparatus of claim 10 wherein said rotating electrical contacts are in a form of electrical contact slipper rings.

20. The apparatus of claim 1 wherein:
said armature assembly support structure includes a roller bearing,
said peripheral counter-rotatable armature assembly portion includes a rotatable bearing sleeve connected to said counter armature rear wall,
said rotatable bearing sleeve is received in said roller bearing, and
said inner tubular axle is received in said rotatable bearing sleeve.

* * * * *